United States Patent
Flitcroft et al.

(10) Patent No.: US 12,471,769 B2
(45) Date of Patent: Nov. 18, 2025

(54) SYSTEM AND METHOD OF DETERMINING AND ANALYSING THE OCULAR BIOMETRIC STATUS OF A PATIENT

(71) Applicant: Technological University Dublin, Dublin (IE)

(72) Inventors: Ian Flitcroft, Dublin (IE); James Loughman, Dublin (IE)

(73) Assignee: Technological University Dublin, Dublin (IE)

( * ) Notice: Subject to any disclaimer, the term of this patent is extended or adjusted under 35 U.S.C. 154(b) by 711 days.

(21) Appl. No.: 17/786,896

(22) PCT Filed: Dec. 21, 2020

(86) PCT No.: PCT/EP2020/087546
§ 371 (c)(1),
(2) Date: Jun. 17, 2022

(87) PCT Pub. No.: WO2021/123455
PCT Pub. Date: Jun. 24, 2021

(65) Prior Publication Data
US 2023/0036691 A1    Feb. 2, 2023

(30) Foreign Application Priority Data
Dec. 20, 2019   (GB) ..................... 1918993

(51) Int. Cl.
*A61B 3/00* (2006.01)
*A61B 5/00* (2006.01)
*G16H 50/70* (2018.01)

(52) U.S. Cl.
CPC .......... *A61B 3/0025* (2013.01); *A61B 3/0041* (2013.01); *A61B 5/4848* (2013.01); *G16H 50/70* (2018.01)

(58) Field of Classification Search
CPC ... A61B 3/0025; A61B 3/0041; A61B 5/4848; G16H 50/70; G16H 50/30; G16H 50/20
(Continued)

(56) References Cited

U.S. PATENT DOCUMENTS

| 6,550,917 B1 * | 4/2003 | Neal ................. A61B 3/14 351/221 |
| 12,232,811 B2 * | 2/2025 | Lopez Gil ............ A61B 3/0033 |

(Continued)

OTHER PUBLICATIONS

Sanz Diez et al., "Growth curves of myopia-related parameters to clinically monitor the refractive development in Chinese schoolchildren," Graefe's Archive for Clinical and Experimental Ophthalmology, 257:1045-1053, 2019.
(Continued)

*Primary Examiner* — Mohammed A Hasan
(74) *Attorney, Agent, or Firm* — Hamilton, Brook, Smith & Reynolds, P.C.

(57) ABSTRACT

A computer implemented system and method for determining and analysing ocular refractive error of an eye. The method determines a set of sample biometric factors for a reference sample of eyes from a set of reference sample physical characteristics. Physical characteristics of a patient's eye are measured such that the type of measured patient physical characteristics include some or all of the reference sample characteristic types. Patient biometric factors are then calculated based on the measured and inherent patient physical characteristics and compared with the sample biometric factors to determine the effect of one or more parameters on the ocular refractive error of an eye. The method may calculate the difference between the refractive contribution of the axial length, cornea and internal optics in the patient's eye and the separate contribution from those factors in the sample physical characteristics.

20 Claims, 10 Drawing Sheets

(58) Field of Classification Search
USPC .......................................................... 351/202
See application file for complete search history.

(56) References Cited

U.S. PATENT DOCUMENTS

| | | | | |
|---|---|---|---|---|
| 2009/0303435 | A1* | 12/2009 | Flitcroft | A61B 3/085 351/210 |
| 2015/0302252 | A1* | 10/2015 | Herrera | G06V 40/70 382/117 |
| 2016/0132670 | A1* | 5/2016 | Salama | G06V 40/172 726/19 |
| 2018/0140181 | A1 | 5/2018 | Brennan et al. | |
| 2019/0142267 | A9 | 5/2019 | Brennan et al. | |
| 2023/0034092 | A1 | 2/2023 | Flitcroft et al. | |

OTHER PUBLICATIONS

Satou et al., "Biometry: a tool for the detection of amblyopia risk factor in children," Graefe's Archive for Clinical and Experimental Ophthalmology, 257:2049-2056, 2019.

Zadnik et al., "Prediction of juvenile-onset myopia," JAMA Ophthalmology, jamaophthalmology.com, published online Apr. 2, 2015.

International Search Report and Written Opinion for International Application No. PCT/EP2020/087546 entitled "A System and Method of Determining and Analysing the Ocular Biometric Status of a Patient," Date of Mailing: Jun. 16, 2021.

Chen, et al., "Identifying Children at Risk of High Myopia Using Population Centile Curves of Refraction," PLoS ONE 11(12): (2016) e0167642. https://doi.org/10.1371/journal.pone.0167642.

Chen, et al., "Reference Centile Curve as a Predictor for High Myopia in Chinese Children," Investigative Ophthalmology & Visual Science Apr. 2014, vol. 55, 3624. available at: https://iovs.arvojournals.org/article.aspx?articleid=2269060 [online].

Cole, T.J., "The Development of Growth References and Growth Charts," Ann Hum Biol. Sep. 2012; 39(5): 382-394.

Gompertz, "XXIV. On the nature of the function expressive of the law of human mortality, and on a new mode of determining the value of life contingencies. In a letter to Francis Baily, Esq. F. R. S. &c," Phil. Trans. R. Soc.115:.513-583. Downloaded Jun. 30, 2022.

Kim, et al., "The 2017 Korean National Growth Charts for Children and Adolescents: development, improvements and prospects," Korean J Pediatr 2018;61(5):135-149.

Myopia Calculator | BHVI, Brien Holden Vision Institute, https://bhvi.org/myopia-calculator-resources/ [online]. Accessed Jul. 29, 2022.

Olsen, T., "On the calculation of power from curvature of the cornea," Br. J. Opthalmol., 70:152-4 (1986).

Rigby, et al., "Smooth Centile Curves for Skew and Kurtotic Data Modelled Using the Box-Cox Power Exponential Distribution," Statistics in Medicine, vol. 23, Issue 19, p. 3053-3076 (Aug. 24, 2004).

Richards, F.J., "A flexible growth Function for empirical use," J. of Exper. Bot. 10:290-300 (1959).

Sankaridurg, et al., "Practical Applications to Modify and Control the Development of Ametropia," Eye, 28, 134-141 (2014).

Tideman, et al. "Axial Length Growth and the Risk of Developing Myopia in European Children," Acta Ophthalmol. 2018: 96: 301-309.

Waloddi Weibull, "A Statistical Distribution Function of Wide Applicability. Journal of Applied Mechanics," American Society of Mechanical Engineers, 6 pages (1951). hal-03112318.

World Health Organization, "WHO Child Growth Standards: Length/height-for-age, weight-for-age, weight-for-length, weight-for-height and body mass index-for-age, Methods and Development," WHO Press, 2006.

* cited by examiner

Corneal Myopia (SER = -7.75 D)

Emmetropic (SER = +0.25 D)

SYSTEM AND METHOD OF DETERMINING AND ANALYSING THE OCULAR BIOMETRIC STATUS OF A PATIENT

This application is the U.S. National Stage of International Application No. PCT/EP2020/087546, filed Dec. 21, 2020, which designates the U.S., published in English, and claims priority under 35 U.S.C. § 119 or 365(c) to Great Britain Application No. 1918993.5, filed Dec. 20, 2019. The entire teachings of the above applications are incorporated herein by reference.

FIELD OF THE INVENTION

The present invention relates to a method and system for determining and monitoring the ocular biometric status of a subject.

BACKGROUND TO THE INVENTION

Conventional growth charts for height, weight, head circumference or body mass index (BMI) are graph based tools which plot age against units relevant to each measurement (eg. metres, kilograms, or BMI ratio).

Lines depicting different population centiles are superimposed on such graphs. By plotting a growth parameter on a gender-matched growth chart, it is possible for the user to manually estimate the centile value by comparing the plotted point with the centile curves. By following this centile to a given age it allows the user to estimate the likely future value of this parameter, e.g. to estimate height at 18 years of age by plotting this value at 5 years of age. While this does not represent an exact prediction centile analysis is a useful clinical decision support that has been used for over a century.

This conventional approach makes it difficult to compare the population centile values for different parameters and to assess how different parameters change over time. Also, due to the rapid growth in small children, multiple such charts are required to plot such parameters from birth to 18 years of age. Such charts have been used for many years and have been subject to numerous revisions, but the basic layout has not changed (WHO Multicentre Growth Reference Study Group. WHO Child Growth Standards: Length/height-for-age, weight-for-age, weight-for-length, weight-for-height and body mass index-for-age: Methods and development. Geneva: World Health Organization, 2006. Cole T J. The development of growth references and growth charts. *Ann Hum Biol.* 2012; 39(5):382-394. Kim J H, Yun S, Hwang S S, et al. The 2017 Korean National Growth Charts for children and adolescents: development, improvement, and prospects. Korean J Pediatr. 2018; 61(5):135-149.)

The few publications that have applied the centile approach to ocular biometry have used the same graphical approach of plotting a single parameter against age and superimposing lines representing age specific centiles:

Chen, Y., Zhang, J., Morgan, I. G., & He, M. (2016). Identifying children at risk of high myopia using population centile curves of refraction. PLoS ONE, 11(12), e0167642.

Tideman, J. W. L., Polling, J. R., Vingerling, J. R., Jaddoe, V. W. V., Williams, C., Guggenheim, J. A., & Klaver, C. C. W. (2018). Axial length growth and the risk of developing myopia in European children. Acta Ophthalmologica, 96(3), 301-309.

Sanz Diez, P., Yang, L. H., Lu, M. X., Wahl, S., & Ohlendorf, A. (2019). Sanz Diez, P., Yang, L.-H., Lu, M.-X., Wahl, S., & Ohlendorf, A. (2019). Growth curves of myopia-related parameters to clinically monitor the refractive development in Chinese schoolchildren. Graefe's Archive for Clinical and Experimental Ophthalmology, 257(5), 1045-1053).

In conventional centile charts the act of plotting each parameter provided the means to determine the corresponding centile value. This process is inaccurate because it requires visual judgment in most cases where the plotted point falls between two plotted centile lines. Such visual extrapolation is also complicated by the highly non-linear relationship between centiles and the underlying parameter, such that the half-way point between the 75th and 95th centiles, for example, would generally not be the 85th centile.

US2018140181A1 provides a method for estimating the expected trajectory of spherical equivalent refraction of an individual over time and comparing that with the expected trajectory of spherical equivalent refraction of an individual using the ametropia control treatment. The future change in spherical equivalent refraction is explicitly stated to be based on a predetermined set rate of change. While mention is made of centiles in this patent, centiles are clearly not the basis of determining that set rate of change in the disclosure as in all the examples the initial and final centiles change. In conventional centile analysis the future projection is based on an individual tracking along a particular centile curve (see 1. Cole T J. The development of growth references and growth charts. Ann Hum Biol 2012; 39: 382-394 for a history of centiles and growth charts). Indeed, the claim refers to a comparison of "the estimated percentile of SPHEQ with the estimated expected SPHEQ trajectory of the individual" indicating that these are expected to different.

US patent application US2019/0142267A9 discloses a method for calculating future values of axial length, without reference to centile calculations, based on a function age, refractive change and current axial length.

A similar graphical comparison of comparing the expected refractive trajectory of an individual with and without the use of a myopia control intervention was published in 2014. (Practical applications to modify and control the development of ametropia P R Sankaridurg & B A Holden, Eye 28, pages 134-141(2014)). This paper described using a population to determine the refractive trajectory and estimating the likely future trajectory if a myopic control intervention were used.

This solution has also been deployed as a publicly available myopia calculator (https://bhvi.org/myopia-calculator-resources/). The use of centiles to predict future outcomes in relation to myopia is also anticipated by a presentation from 2014 (https://iovs.arvojournals.org/article.aspx?articleid=2269060).

All these approaches have in common the idea of predicting future refraction or axial length based on comparing an individual to a reference group with or without myopia control. This issue is now of practical importance as a range of interventions are becoming available that can slow myopic progression. While such myopia calculators and currently available papers regarding centiles in refractive development offer some guidance as to possible benefits of myopia control on refraction and axial length, they do not address several very important questions regarding managing refractive errors in this new era of active refractive management. Rather projecting the future benefits of myopia control in a myope, the more important clinical questions relate to why such a patient is myopic and what is the appropriate form treatment. If myopia treatment is applied, is it having the desired effect on eye growth (i.e. in terms of a change in axial length)? Such a determination requires calculation of the contribution of axial length and other optical factors to the measured refraction, ideally over a period of time.

It is an object of the invention to overcome at least one of the above-referenced problems.

SUMMARY OF THE INVENTION

The Applicant has addressed the problems of the prior art by providing a method of accurately and clearly monitoring ocular biometric status in a patient that comprises converting clinically relevant ocular measurements into age-matched normalised parameters (population centile %), and plotting the normalised parameters, generally over a suitable time period, in a single chart (a "refractogram"), allowing evidence based decisions regarding whether to actively treat existing myopia or not and to assess efficacy of treatment. In broader medical applications for non-ocular parameters, this format of plotting age-matched normalised parameters (population centile %) against age can be termed a "centogram". In one embodiment, the method allows a clinician to easily visualise how one or more of specific clinically relevant ocular parameters are changing in the patient over time relative to the population, and thus can be used to predict the development of myopia, predict the severity of myopia that is developing, and monitor therapy in the patient (such as corrective lens therapy).

A fundamental difference of ocular biometry as compared to anthropomorphic measurements such as height or weight is that the eye has an optical function. This means that the dimensions, curvature and position of ocular components can all influence the optical performance of the eye as measured in terms of refractive error (usually specified in dioptres). For height and weight, the parameter of body mass index is often calculated. For the eye, the ratio of axial length to corneal radius (ALCR ratio) is also often calculated, but this invention addresses the inter-relationship between ocular biometric values to create to new indices that can help to guide management decisions. Calculations of ocular parameters may be used to determine the required power of an intraocular lens for cataract surgery or phakic intra-ocular lenses. Refractive errors in children have been managed historically by correcting the refractive error optically (i.e. only the refractive error measurement is required), but are now starting to be managed in a new way, with eye drops or lenses designed to slow down eye growth. These new treatment approaches can benefit from consideration of the biometric factors that contribute to the refractive error.

In one embodiment, basic ocular biometric parameters (eg. spherical equivalent refraction, spherocylindrical refraction, astigmatic power, astigmatic axis, axial length, corneal radius, corneal keratometric power, lens thickness, axial length:corneal radius ratio, vitreous chamber depth (VCD), lens power, and the annualised rate of change of any of these parameters) are converted into appropriate age and gender specific centiles by comparison with a reference population. These centiles are plotted either as direct centiles can all be plotted on a single graph which plots centile values for each parameter against age. In this case four separate parameters are plotted at different time points: annual change in spherical equivalent refraction (PROG), axial length-corneal radius ratio (ALCR), spherical equivalent refraction (REF) and axial length (AXL). There is a non-linear relationship between centile value and each parameter, furthermore this relationship varies from parameter to parameter. Final predictions for each parameter are therefore plotted as additional axes (i.e. the adult parameter values corresponding to the centile axis values). To convert back from centile value to the units of each parameter, axes can also be presented at a defined age. Comparable plots can also be constructed using Z-scores which measure the difference between a variable and the mean of a reference population (mean_x) as a function of the standard deviation (sd_x). This is calculated for a given variable (x) as:

$$Z=(x-\mathrm{mean}\_x)/\mathrm{sd}\_x \qquad \text{equation 1)}$$

As with centiles, for certain parameters the sign of the Z score needs to be reversed to ensure that changes in a given parameter are positively correlated with the degree of myopia. For axial length, if equation 1 is used, then refraction (such spherical equivalent refraction, SER) needs to be calculated as $$Z=(\mathrm{mean\_SER}-\mathrm{SER})/\mathrm{sd\_SER}. \qquad \text{equation 2)}$$

This invention allows all important growth parameters to be plotted and compared over time on a single chart. This is important for clinicians to make informed management decisions and refractive management. An additional advantage is that all the requisite information can be presented in a compact way, which is ideal for presentation on digital device screens. It can also be used as a means to provide an indicator of the likely final degree of myopia (which is important as the risk of complications are linked to the degree of myopia as indicated by axial length or refraction), and a means of providing evidence to parents to support their decision regarding whether to enter their child into a recommended programme of active myopia treatment (education is a key requirement) or directly to adult patients. The method and system of the invention can also be employed to track active myopia management to determine efficacy of treatment—i.e. monitoring the patient's ocular centiles which provides a direct indicator of changing status and can be used as a means to decide whether to change or cease treatment.

In a first aspect, the invention provides a computer implemented method comprising the steps of:

inputting into a computational model one or patient phenotype parameters for the patient (i.e. age, gender, ethnicity) and a plurality of measurements for at least one health parameter obtained from the patient spanning a period of analysis (for example spanning a period of therapy or period of monitoring);

comparing, by the computational model, each of the plurality of measurements and the patient phenotype parameters with population data for the at least one health parameter;

converting, by the computational model, each of the plurality of measurements into a patient phenotype-specific centile parameter;

graphically representing in a centogram the change in the patient phenotype-specific centile parameters of the at least one health parameter during the period of analysis.

Advantageously, the present invention can create a clinically useful indices of biometric status when using a limited amount of patient input data such as refraction and demographic factors. It can provide progressively more accurate and detailed indices of biometric status with more input data is available.

The health parameter (or parameters) may be selected from ocular parameters, growth parameters (i.e. height (or length for infants), BMI, weight, etc), cardiovascular parameters (blood pressure, cholesterol level, lipoprotein fraction levels, ECG, etc), respiratory parameters, neurological parameters, or any other health parameters. In one embodiment, the patient is undergoing therapy for a condition related to the health parameter(s). For example, when the health parameter being measured is a cardiovascular health parameter, the patient may be undergoing therapy for treatment or prevention of a cardiovascular condition (for example being treated with a blood pressure lowering drug, or a statin), and the method can be employed to monitor the cardiovascular health parameters during the period of treatment to assess changes in patient phenotype-specific centile parameter for one or more health parameters.

In one embodiment, the at least one health parameter is an ocular parameter, and the centogram is a refractogram. The at least one ocular parameter may be selected from refraction, axial length, rate of change of refraction/yr, rate of change of axial length/yr corneal radius, corneal keratometric power corneal radius, corneal keratometric power, axial length to corneal radius (ALCR) ratio and myopia progression. Generally, a plurality of ocular parameters are employed, for example at least 3 or 4. Thus, in one embodiment, the method is a method of determining ocular biometric status of a patient during a period of analysis, and comprises a step of determining the ocular biometric status of the patient during the period of analysis based on the refractogram. The term refractogram applies to ocular parameters, but, as noted above, the core features of the invention can be applied to other health parameters. For such applications the broader term, centogram, can be used.

The method of the invention comprises calculating centile values from individual parameters and patient specific values such as ethnicity, age and gender. In conventional centile charts the act of plotting each parameter provided the means to determine the corresponding centile value. This process is inaccurate because it requires visual judgment in most cases where the plotted point falls between two plotted centile lines. Such visual extrapolation is also complicated by the highly non-linear relationship between centiles and the underlying parameter, such that the half-way point between the 75th and 95th centiles, for example, would generally not be the 85th centile. This invention provides for the means (generally a sigmoid function) to accurately calculate the centile value from an underlying mathematical model which properly accounts for the non-linearity of the biometric parameter to centile relationship and provides for accurate extrapolation between ages to allow for date specific calculations of centile values. The invention found that by applying a sigmoid function to the measurements obtained errors in the age-specific centile parameter are removed resulting in a better determination of the ocular biometric status for the patient. Such a sigmoid function is based on a logistic function or curve using a S-shape curve used in statistical models. The present invention provides a model that fits a multiple cumulative gaussian model using non-linear optimisation.

In one embodiment, the patient is undergoing therapy, for example ocular therapy, for example corrective lens therapy or another form of myopia control therapy, where the refractogram graphically represents the change in the age-specific centile parameters of the at least one ocular (or health) parameter during a period of therapy.

In one embodiment, the ocular biometric status is the effectiveness of the therapy.

Examples of biometric status outside treatment would include:

1) Risk of a non-myopic patient developing myopia by a certain age (for example by 18 years of age (including low risk, moderate risk or high risk);
2) Identifying stable myopia in a myopic patient; or
3) Risk (high risk or low risk) of myopic patient developing high myopia (−6D or worse).
4) Risk of a patient developing visual impairment at a specific age in the future
5) Risk of patient developing a level of myopia that may preclude corneal refractive surgery on the basis of other biometric factors (notably corneal thickness).

Examples in Myopic Patients Undergoing Treatment:
1) Progressing at well below median annual progression rate (<$40^{th}$ centile) on treatment—successful treatment
2) Progressing close to median annual progression rate ($40^{th}$ to $60^{th}$ centile) on treatment—questionable benefit
3) Progressing above $60^{th}$ centile on treatment—poor treatment response
4) Reduction in centile of annual progression of more than 10 points, in treatment period as compared to pre-treatment period—successful treatment
5) Centile of annual progression during treatment phase within 10 points of pre-treatment values—questionable benefit
6) Centile of annual progression during treatment phase 10 points greater than pre-treatment values—unsuccessful treatment.

In one embodiment, the ocular biometric status is the risk of development of myopia (prognosis). In one embodiment, the computational model is configured to provide a risk score of the patient subsequently developing myopia.

In one embodiment, the ocular biometric status is the risk of developing severe myopia. In one embodiment, the computational model is configured to provide a risk score of the patient subsequently developing severe myopia. This relates to the identification of pre-myopes who merit closer observation/monitoring and thereby providing the option for earlier intervention which is considered advantageous in myopia control.

In one embodiment, the ocular biometric status is a prediction of the severity of myopia that will develop in the patient. In one embodiment, the computational model is configured to provide an estimate of the severity of the myopia predicted to develop in the patient.

In one embodiment, the patient phenotype parameter is age (i.e. age in years, or in year bands such as 2-3 years, 4-5 years, 6-7 years etc) and optionally one or more of gender, ethnicity or geography. In one embodiment, the patient phenotype parameters inputted into the computational include age, gender and one or both of ethnicity or geography.

Typically, the method employs a plurality of ocular parameters including at least 2, 3 or 4 of refraction, axial length, corneal radius, corneal keratometric power, axial length to corneal radius (ALCR) ratio and myopia progression. In this embodiment, the method typically includes the steps of:
  inputting into a computational model a plurality of measurements of a plurality of ocular parameters obtained from the patient during a period of analysis (i.e. therapy or monitoring),
  comparing, by the computational model, each of the plurality of measurements and the age of the patient with population data for each of the plurality of ocular parameters;

converting, by the computational model, each of the plurality of measurements into an age-specific centile parameter; and graphically represent the change in the age-specific centile parameters for each of the plurality of ocular parameters over the period of analysis, and determining the ocular biometric status of the patient based on the graphically represented change in age-specific centile parameters of the plurality of ocular parameters over time.

In one embodiment, the population data for the at least one ocular parameter employed in the comparison step comprises age and sex matched population data, and the method generally includes a step of inputting into the computational model the sex of the patient. In this embodiment, the computational model converts each of the plurality of measurements into an age and sex matched centile parameter;

In one embodiment, the population data for the at least one ocular parameter employed in the comparison step comprises ethnicity, age and sex matched population data.

In one embodiment, the population data for the at least one ocular parameter employed in the comparison step comprises ethnicity, age, geography and sex matched population data.

In one embodiment, the method includes a step of inputting into the computational model the ethnicity of the patient.

In one embodiment, the method of the invention is a method of monitoring effectiveness of the myopia control therapy (e.g. with modified glasses, myopia control contact lenses or pharmacological treatments) over the period of time and optionally assisting a healthcare professional prescribe an alternative or more suitable therapy for the patient. The therapy may be a passive ocular management (therapy) or an active ocular management (therapy).

In one embodiment, the method is applied in relation to laser refractive surgery in order to determine/predict when a patient is likely to stabilise or when a stable refraction has been achieved so as to plan timing of refractive surgery.

In one embodiment, the method is applied in a patient following laser refractive who is showing signs of regression (a myopic shift in refraction) to determine which ocular parameter(s) are responsible and to guide clinical management. A change in corneal parameters would indicate the need for re-treatment or the development of corneal ectasia. A change in axial length would indicate continued myopic progression that would be best managed with myopia control therapy.

In one embodiment, the method includes a step of administering a therapy to the patient based on the determination of the ocular biometric status.

In one embodiment, the patient is selected from an infant, a child, an adolescent, and an adult.

In another aspect, the invention provides a method of treating a patient with an ocular therapy comprising the steps of determining the ocular biometric status of the patient according to a method of the invention, and administering an ocular therapy to the patient based on the determination of the ocular biometric status.

In one embodiment, the ocular therapy is an active ocular management (therapy). In one embodiment, the ocular therapy is a passive ocular management (therapy).

In another aspect, the invention provides a computer implemented method comprising the steps of:

inputting into a computational model one or patient phenotype parameters for the patient (i.e. age, gender, ethnicity) and a measurement for each of a plurality of health parameters obtained from the patient;

comparing, by the computational model, the health parameter measurement and the patient phenotype parameter with population data for the health parameter; converting, by the computational model, the measurement into a patient phenotype-specific centile parameter for each health parameter;

graphically representing in a refractogram the patient phenotype-specific centile parameter for each health parameter during the period of analysis.

In another aspect, the invention provides a computer implemented system to determine health status of a patient during a period of analysis (typically during a period of therapy or health monitoring) and comprising:

a computational model configured to:

receive as an input the age of the patient and a plurality of measurements for a health parameter obtained from the patient;

compare each of the plurality of measurements and the age of the patient with population data for the at least one health parameter and generate a plurality of age-specific centile parameter for the at least one health parameter; and graphically represent in a refractogram the change in the age-specific centile parameters of the at least one health parameter over the period of analysis, and a display system to display the refractogram.

In another aspect, the invention provides a computer implemented system to determine ocular biometric status of a patient (typically during a period of analysis)) and comprising:

a computational model configured to:

receive as an input the age of the patient and a plurality of measurements for an ocular parameter selected from refraction, axial length, corneal radius, corneal keratometric power, axial length to corneal radius (ALCR) ratio and myopia progression obtained from the patient;

compare each of the plurality of measurements and the age of the patient with population data for the at least one ocular parameter and generate a plurality of age-specific centile parameters for the at least one ocular parameter; and graphically represent in a refractogram the change in the age-specific centile parameters of the at least one ocular parameter over the period of analysis, and a display system to display the refractogram.

In one embodiment, the system comprises a determination system for obtaining from the patient the plurality of measurements for the health or ocular parameter.

In one embodiment, the system comprises a storage system for storing health or ocular parameter measurements and optionally population data for the health or ocular parameter.

In one embodiment, the system comprises a communication module configured to receive input data from a remote location and transmit the refractogram to a remote location.

In one embodiment, the computational model is configured to:

receive as an input the age of the patient and the plurality of measurements for each of the plurality of ocular (or health) parameters;

compare each of the plurality of measurements and the age of the patient with population data for ocular (or health) parameters and generate a plurality of age-specific centile parameters for each of ocular (or health) parameters; and graphically represent in a refractogram the change in the age-specific centile parameters for each of the ocular (or health) parameters over the period of analysis.

In one embodiment, the plurality of ocular parameters includes at least three ocular parameters selected from refraction, axial length, corneal radius, corneal keratometric power, ALCR ratio and myopia progression.

In one embodiment, the plurality of ocular parameters includes refraction, axial length, ALCR ratio and myopia progression ocular parameters.

In another aspect, the invention provides a computer program comprising program instructions for causing a computer to perform the method of the invention.

In one embodiment, the computer program is embodied on a record medium, a carrier signal, or a read-only memory.

Other aspects and preferred embodiments of the invention are defined and described in the other claims set out below.

In accordance with another aspect of the invention there is provided a computer implemented method for analysing ocular refractive error of an eye, the method comprising the steps of:
- determining a set of sample biometric factors for a reference sample of eyes which are derived from a set of reference sample physical characteristics;
- measuring patient physical characteristics of a patient's eye such that the type of measured patient physical characteristics include some or all of the reference sample characteristic types;
- calculating patient biometric factors based on the measured and inherent patient physical characteristics;
- comparing the sample biometric factors with the patient biometric factors to determine the effect of one or more parameters on the ocular refractive error of the eye.

Advantageously, the present invention can create a clinically useful indices of biometric status when using a limited amount of patient input data such as refraction and demographic factors. It can provide progressively more accurate and detailed indices of biometric status with more input data is available.

In one embodiment, the measured physical characteristics comprise at least one of axial length, corneal curvature/power and refraction.

In one embodiment, the step of comparing the sample biometric factors with the patient biometric factors further comprises separately calculating the difference between the refractive contribution of the axial length, cornea and internal optics in the patient's eye and the contribution from those factors in the sample physical characteristics.

In one embodiment, the result of calculating the difference between the refractive contribution is described by means of dioptric power for each factor as a percentage contribution to the patient's refractive error.

In one embodiment, the dioptric power contribution is calculated separately for each of the biometric factors from the patient measured physical characteristics.

In one embodiment, the dioptric power of the eye is calculated from the difference between an overall refraction of the eye and the contributions made by the axial length and corneal curvature/power.

In one embodiment, the inherent patient physical characteristics comprise age and/or gender of patients.

In one embodiment, inherent patient physical characteristics the sample biometric factors represent a normal or average value for each of these factors for the reference sample.

In one embodiment, the sample biometric factors represent a normal or average value for each of these parameters in an eye with no refractive error, an emmetropic eye and the associated dioptric value.

In one embodiment, the sample biometric factors include axial length, corneal curvature/power and internal dioptric power (IDP) of the eye.

In one embodiment, the step of determining a set of sample biometric factors for a reference sample of eyes comprises:
- obtaining normative population data for axial length, corneal curvature (or corneal power) and refraction across a range of ages;
- using the normative population data to determine average value of axial length and corneal curvature (or power) for an emmetropic eye in a patient of that age and gender in the population;
- deriving the average internal dioptric power
- determining the contribution of the axial length, corneal curvature and internal dioptric power to the refractive power of an emmetropic eye in a patient of that age and gender in the population.

In one embodiment, the step of calculating patient biometric factors based on the measured patient physical characteristics comprises:
- calculating the contribution to the refraction in a patient's eye from axial length, cornea and internal dioptric power, and
- converting each value to dioptric power in the spectacle plane (ser) at a specified distance from the corneal vertex (vertex_distance) to allow direct comparison with the clinically measured refraction.

In one embodiment, the ocular refractive error is presented graphically on a graphical user interface as a map.

In one embodiment, the ocular refractive error is presented graphically as a graph plotting age against dioptric contribution showing the values of each contributory factor after a single measurement.

In one embodiment, the result is presented graphically in the form of a three-parameter radar plot showing the dioptric value of each factor compared to an emmetropic eye for someone of that age, gender and population.

In one embodiment, the result is presented graphically in the form of a three-parameter radar plot showing the centile value of each factor compared to an emmetropic eye for someone of that age, gender and population.

In one embodiment, the result is presented graphically as a graph plotting age against dioptric contribution showing the values of each contributory factor after a plurality of time separated measurements.

In one embodiment, the results are presented as a graph plotting age against dioptric contribution showing the values of each contributory factor at each of the time separated measurements.

In accordance with another aspect of the invention there is provided a computer program comprising program instructions for causing a computer to perform a method comprising the steps of:
- determining a set of sample biometric factors for a reference sample of eyes which are derived from a set of reference sample physical characteristics;
- measuring patient physical characteristics of a patient's eye such that the type of measured patient physical characteristics include some or all of the reference sample characteristic types;
- calculating patient biometric factors based on the measured patient physical characteristics;

comparing the sample biometric factors with the patient biometric factors to determine the effect of one or more parameters on the ocular refractive error of the eye.

In one embodiment, the computer program is embodied on a record medium as a carrier signal or on a read only memory.

In accordance with another aspect of the invention there is provided hardware, software and firm ware for implementing the method the present invention.

DETAILED DESCRIPTION OF THE INVENTION

Figure 1:
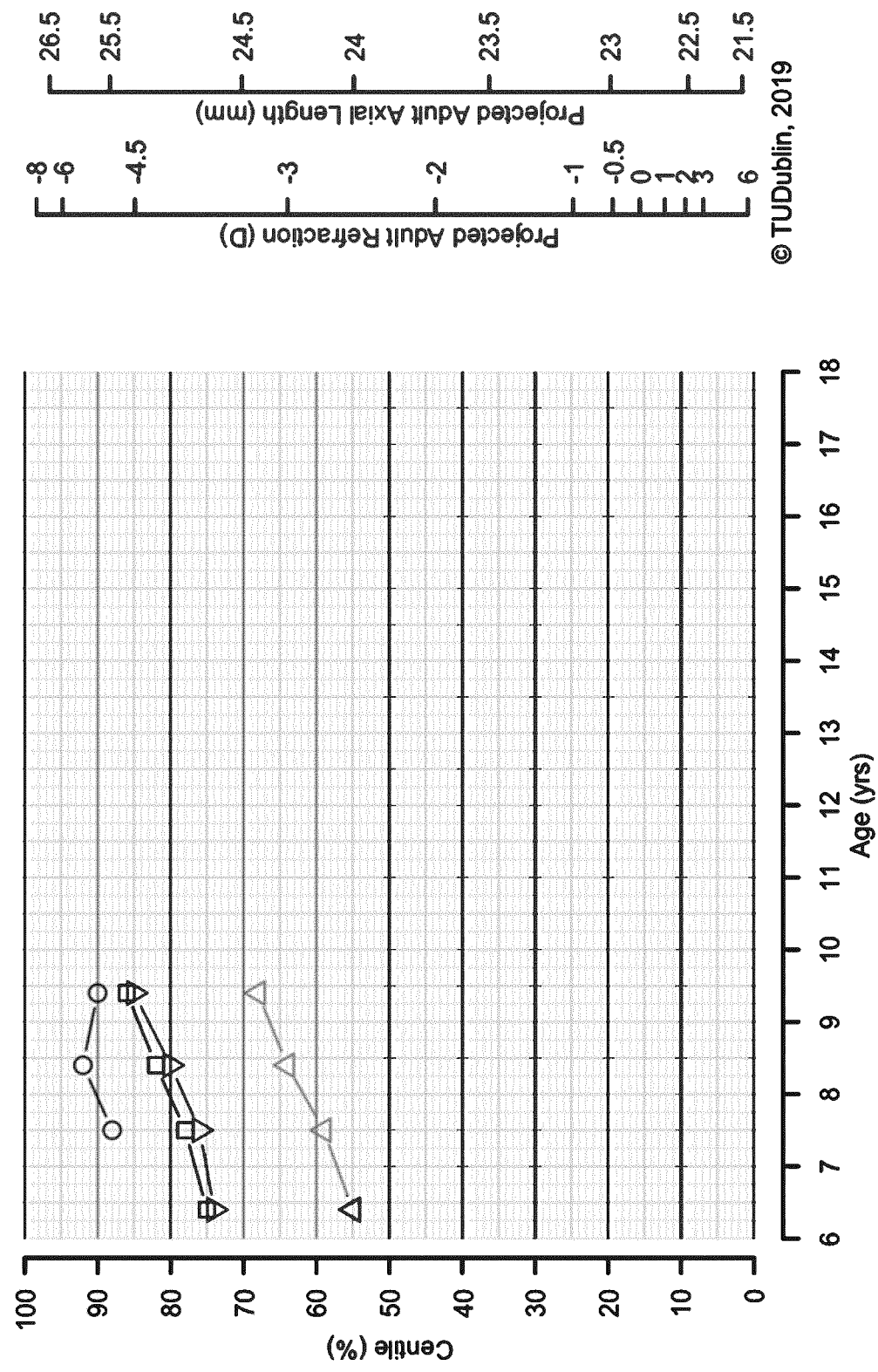
FIG. 1 shows a refractogram with representative centile data representing annualised rate of change of ocular refraction (PROG), ALCR ratio, ocular refraction (REF) and axial length (AXL) for a single subject over three years from 6.5 years to 9.5 years of age during a period of observation.

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "disease" is used to define any abnormal condition that impairs physiological function and is associated with specific symptoms. The term is used broadly to encompass any disorder, illness, abnormality, pathology, sickness, condition or syndrome in which physiological function is impaired irrespective of the nature of the aetiology (or indeed whether the aetiological basis for the disease is established). It therefore encompasses conditions arising from infection, trauma, injury, surgery, radiological ablation, age, poisoning or nutritional deficiencies.

As used herein, the term "treatment" or "treating" refers to an intervention (e.g. the administration of an agent to a subject) which cures, ameliorates or lessens the symptoms of a disease or removes (or lessens the impact of) its cause(s) (for example, the reduction in accumulation of pathological levels of lysosomal enzymes). In this case, the term is used synonymously with the term "therapy".

Additionally, the terms "treatment" or "treating" refers to an intervention (e.g. the administration of an agent to a subject) which prevents or delays the onset or progression of a disease or reduces (or eradicates) its incidence within a treated population. In this case, the term treatment is used synonymously with the term "prophylaxis".

As used herein, an effective amount or a therapeutically effective amount of an agent defines an amount that can be administered to a subject without excessive toxicity, irritation, allergic response, or other problem or complication, commensurate with a reasonable benefit/risk ratio, but one that is sufficient to provide the desired effect, e.g. the treatment or prophylaxis manifested by a permanent or temporary improvement in the subject's condition. The amount will vary from subject to subject, depending on the age and general condition of the individual, mode of administration and other factors. Thus, while it is not possible to specify an exact effective amount, those skilled in the art will be able to determine an appropriate "effective" amount in any individual case using routine experimentation and background general knowledge. A therapeutic result in this context includes eradication or lessening of symptoms, reduced pain or discomfort, prolonged survival, improved mobility and other markers of clinical improvement. A therapeutic result need not be a complete cure. Improvement may be observed in biological/molecular markers, clinical or observational improvements. In a preferred embodiment, the methods of the invention are applicable to humans, large racing animals (horses, camels, dogs), and domestic companion animals (cats and dogs).

In the context of treatment and effective amounts as defined above, the term subject (which is to be read to include "individual", "animal", "patient" or "mammal" where context permits) defines any subject, particularly a mammalian subject, for whom treatment is indicated. Mammalian subjects include, but are not limited to, humans, domestic animals, farm animals, zoo animals, sport animals, pet animals such as dogs, cats, guinea pigs, rabbits, rats, mice, horses, camels, bison, cattle, cows; primates such as apes, monkeys, orangutans, and chimpanzees; canids such as dogs and wolves; felids such as cats, lions, and tigers; equids such as horses, donkeys, and zebras; food animals such as cows, pigs, and sheep; ungulates such as deer and giraffes; and rodents such as mice, rats, hamsters and guinea pigs. In preferred embodiments, the subject is a human. As used herein, the term "equine" refers to mammals of the family Equidae, which includes horses, donkeys, asses, *kiang* and zebra.

"Ocular biometric status" refers to the status of ocular disease in a patient based on measurements of ocular parameters in the patient, typically over a period of analysis. The status may include diagnosis of myopia, prediction of the risk of developing myopia by a certain age (i.e. by 18 years of age), including high risk, low risk or moderate risk, especially risk of severe myopia, prediction of the severity of myopia that will develop in the patient, monitoring therapy during a period of therapy to determine the effectiveness of the therapy, and identification of suitable therapy for the patient. The patient may be myopic or non-myopic. The status may include deterring stable myopia in a patient that is myopic. The biometric status also relates to determining the individual and combined contribution of individual biometric input variables to the refractive error, such as axial length, corneal curvature, lens power, lens thickness, curvature of lens surfaces, corneal thickness, vitreous chamber depth (VCD), lens power and anterior chamber depth.

"Health parameter" refers to a measurable parameter that is generally employed in determining the health of a patient. The health parameter may be selected from ocular parameters, growth parameters (i.e. height (or length for infants), BMI, weight, etc), cardiovascular parameters (blood pressure, cholesterol level, lipoprotein fraction levels, ECG, etc), respiratory parameters, neurological parameters, or any other health parameters. In one embodiment, the patient is undergoing therapy for a condition related to the health parameter(s). For example, when the health parameter being measured is a cardiovascular health parameter, the patient may be undergoing therapy for treatment or prevention of a cardiovascular condition (for example being treated with a blood pressure lowering drug, or a statin), and the method can be employed to monitor the cardiovascular health parameters during the period of treatment to assess changes in patient phenotype-specific centile parameter for one or more health parameters.

"Ocular parameter" refers one or more of refraction, axial length, axial length to corneal radius (ALCR) ratio, myopia progression. spherical equivalent refraction, spherocylindrical refraction, astigmatic power, astigmatic axis, corneal radius, corneal keratometric power, corneal thickness, anterior chamber depth, vitreous chamber depth (VCD), lens power, and lens thickness. The method of the invention generally comprises taking at least two measurement of at least one, and generally more than one, ocular parameter, over a period of analysis. The period of analysis may be a period of therapy where the patient is undergoing therapy, such as corrective lens therapy or other form of active myopia management. Typically, for the or each ocular parameter, more than two measurements over the period of analysis, for example 3, 4, 5, 6 or 7 measurements. In one embodiment, four ocular parameters are employed, namely refraction, axial length, axial length to corneal radius (ALCR) ratio, myopia progression "Refraction" refers to optical correction in dioptres required in the spectacle plane (typically 12 mm from back surface of spectacle lens to the anterior surface of the cornea) that ensures rays of light entering the eye parallel to the optic axis are brought to a focus in front of the retina when ocular accommodation is relaxed. Refraction may also refer to a combination of spherocylindrical lens powers with an associated orientation axis. Refraction can also be represented as power vectors (M, J0, and J45). Refraction can also be specified as a single spherical power, the spherical equivalent refraction.

"Axial length" refers to distance in millimetres from the anterior surface of the cornea to the anterior surface of the retina if measured with ultrasound or to the level of the retinal pigment epithelium if measured with partial coherence interferometry.

"Corneal radius" refers to the radius of curvature of the anterior corneal surface (measured in mm). Due to asphericity of the cornea this may vary with corneal meridian and in such cases corneal radius may be represented as a single value by the average of the radius along two meridian or expressed as two values together with an orientation parameter for each value (measured in degrees).

"Corneal keratometric power" refers to the combined optical refracting power of the anterior corneal surface and posterior corneal surface (measured in dioptres). It is conventionally calculated as 337.5/cr where cr=corneal radius in millimetres. Due to asphericity of the cornea this may vary with corneal meridian and in such cases corneal keratometric power may be represented as a single value by the average of the power along two meridian or expressed as two values together with an orientation parameter for each value (measured in degrees).

"ALCR ratio" refers to the ratio of the axial length (measured in mm) to the average corneal radius (measured in mm).

"Myopia progression" refers to annualised rate of change of the spherical equivalent refraction.

"Period of analysis" refers to the time period during which the plurality of measurements of the or each ocular (or health) parameter are taken. It is generally between 3 and 18 months, typically it is 6-monthly or 12-monthly but may extend due to delayed appointments. Typically, the time period between measurements is at least 3-6 months. For example, the period of analysis may be over several years in which measurements are taken every 6-12 months. In cases of unusually fast myopic progression, ocular parameter measurements may be taken more frequently, e.g. every 3 months or less. The patient may be undergoing therapy during the period of analysis (for example an ocular therapy).

"Population data for the health parameter" refers to a data set containing age-matched health parameter measurements for a given population of subjects, "Population data for the ocular parameter" refers to a data set containing age-matched ocular parameter measurements for a given population of subjects, in which the ocular parameter is selected from refraction, axial length, corneal radius, corneal keratometric power, axial length to corneal radius (ALCR) ratio and myopia progression. Typically, the population data for the or each ocular parameter is also gender (sex) matched, and ideally also one or more of ethnicity or geography matched. In this embodiment, the method of the invention includes an additional step of inputting into the computational model additional phenotypic parameters for the patient (i.e. gender, ethnicity, or geography), and the computational model converts the ocular parameter measurements into patient phenotype parameter matched centiles for the ocular parameter for the patient. Population data may be representative of the population in general, or representative of a clinical population of the which the patient is a member. A range of published scientific data has been provided from a large number of population-based epidemiological studies including:

Chen, Y., Zhang, J., Morgan, I. G., & He, M. (2016). Identifying children at risk of high myopia using population centile curves of refraction. PLoS ONE, 11(12), e0167642;

Tideman, J. W. L., Polling, J. R., Vingerling, J. R., Jaddoe, V. W. V., Williams, C., Guggenheim, J. A., & Klaver, C. C. W. (2018). Axial length growth and the risk of developing myopia in European children. Acta Ophthalmologica, 96(3), 301-309;

Sanz Diez, P., Yang, L. H., Lu, M. X., Wahl, S., & Ohlendorf, A. (2019). Sanz Diez, P., Yang, L.-H., Lu, M.-X., Wahl, S., & Ohlendorf, A. (2019). Growth curves of myopia-related parameters to clinically monitor the refractive development in Chinese schoolchildren. Graefe's Archive for Clinical and Experimental Ophthalmology, 257(5), 1045-1053. https://doi.orq/10.1007/s00417-019-04290-6).

Certain cross sectional health studies as the National Health and Nutrition Examination Survey (NHANES) and Korean National Health and Nutrition Examination Survey (KNHANES) have reported ocular measurements for a range of ages over a number years.

In addition, data sources can be used that have not been published. Such data sources include the individual patient data from published studies that provide additional information, anonymised electronic medical records from ophthalmological and optometric practices, and unpublished population studies.

"Patient phenotype parameter" refers to the age, gender, ethnicity or geography of the patient. The age may be the age of the patient in years, or an age band that the patient fits into (for example 2-4 years, 5-7 years, 8-10 years etc). The gender is generally male or female. The ethnicity of the patient may be selected from an appropriate list for the target population as ethnic classifications vary from country to country. For example in the UK this is specified as part of the census process (see https://www.ethnicity-facts-figures.service.gov.uk/ethnic-aroups). In the US the following list is used for census purposes: Alaska Native, American Indian, Asian, Black or African American, Hispanic or Latino, Native Hawaiian and Pacific Islander, Some Other Race, Two or More Races, White.

"Patient phenotype matched centile parameter" means the centile position of a specified parameter as compared to a population that represents the patient including at least one of the following parameters: age, gender, ethnic group, geographical region or country of residence, number of myopic parents or other defined risk factor for refractive error.

"Refractogram" refers to a graphical depiction of the change in one or more clinically relevant ocular parameters in the form of age-matched (and ideally also gender, ethnicity and/or geography matched) centile parameters in a patient as the patient ages during a period of analysis. Typically, the refractogram plots the change in centile % for the patient for a plurality of ocular parameters selected from refraction, axial length, axial length to corneal radius (ALCR) ratio and myopia progression during the period of analysis. Generally, the Y-axis is centile % and the X-axis is age of the patient during the period of analysis. The Y axis can also represent other standardized age-specific scores such as z-score (as defined above). The z-score is most statistically appropriate for normally distributed data. Refractive error data is often skewed, so the underlying measurements can be transformed depending on the population distribution using techniques such as a Box-Cox transformation. The optimal values for this transformation are determined from the overall population. The transformed data can then be tested to see if post-transformation it is normal. The transformation can then be applied to the individual input data and a valid z-score derived from the mean and standard deviation of the transformed population.

"Active myopia management" refers to the treatment of myopia using therapies designed to prevent or slow down the progression of myopia. It is distinguished from "passive myopia management" which involves the prescription of optical lenses designed to eliminate the blurred vision symptoms associated with myopia and other forms of refractive error "Myopia control therapy" refers to any form of treatment that is designed to reduce the progression of myopia development or reduce the rate of axial elongation of the eye.

"Centogram" refers to a graphical depiction of the change in one or more clinically relevant health parameters in the form of age-matched (and ideally also gender, ethnicity and/or geography matched) centile parameters in a patient as the patient ages during a period of analysis. Typically, the centogram plots the change in centile % for the patient for a plurality of health parameters selected from height (or length for infants), head circumference, BMI, weight, cardiovascular parameters (blood pressure, cholesterol level, lipoprotein fraction levels, ECG, etc), respiratory parameters, neurological parameters, or any other health parameters during the period of analysis. Generally, the Y-axis is centile % and the X-axis is age of the patient during the period of analysis.

"Sigmoid function" refers to a mathematical function having a characteristic "S"-shaped curve or sigmoid curve. A standard choice for a sigmoid function is the logistic function. Examples of suitable sigmoid functions include logistic sigmoid function:

Richards F J. A flexible growth function for empirical use. J of Exper Bot. 1959; 10:290-300.

Gompertz B. On the nature of the function expressive of the law of human mortality, and on a new mode of determining the value of life contingencies. Phil Trans of the Royal Soc. 1825; 182:513-585.

Weibull W. A statistical distribution function of wide applicability. J of Appl Mech. 1951; 18:293-297.

Other sigmoid functions include Box-Cox power exponential (i.e. Rigby R A, Stasinopoulos D M, 2004. Smooth centile curves for skew and kurtotic data modelled using the Box-Cox power exponential distribution. Statistics in Medicine, 23:3053-3076).

The invention describes a system for graphically representing ocular biometric status of a patient during a period of analysis. The system comprises a computational model configured to receive inputs comprising the age of the patient and measurements of at least one (preferably a plurality of) ocular parameters over the period of analysis. A computational model provides for calculation of empirical centiles for the reference population at a variety ages, and from those values provides an explicit function to allow extrapolation between the calculated empirical centiles for any specific parameter value for a given age. The computational model is typically configured to correlate the age of the patient and ocular parameters measurements with population data for the ocular parameter and calculate age-matched centile parameters corresponding to the ocular parameter measurements, and then graphically represent the change in ocular parameters as a centile parameter (centile %) over the period of analysis. In some embodiments the patient will be undergoing ocular therapy (for example corrective lens therapy), and the measurements will be taken during the period of therapy.

The system of the invention may comprise a determination system (to take measurements of ocular parameters), a storage system (for storing measurements), and/or a comparison system (for comparing input data with population data). These functional modules can be executed on one, or multiple, computers, or by using one, or multiple, computer networks. The determination system has computer executable instructions to provide e.g., sequence information in computer readable form.

The information determined in the determination system can be read by the storage system. As used herein the "storage system" is intended to include any suitable computing or processing apparatus or other device configured or adapted for storing data or information. Examples of an electronic apparatus suitable for use with the present invention include a stand-alone computing apparatus, data telecommunications networks, including local area networks (LAN), wide area networks (WAN), Internet, Intranet, and Extranet, and local and distributed computer processing systems. Storage devices also include, but are not limited to: magnetic storage media, such as floppy discs, hard disc storage media, magnetic tape, optical storage media such as CD-ROM, DVD, electronic storage media such as RAM, ROM, EPROM, EEPROM and the like, general hard disks and hybrids of these categories such as magnetic/optical storage media. The storage system is adapted or configured for having recorded thereon growth response information and growth response fingerprint information. Such information may be provided in digital form that can be transmitted and read electronically, e.g., via the Internet, on diskette, via USB (universal serial bus) or via any other suitable mode of communication.

The storage system may have population data for ocular parameters stored thereof. As used herein, "stored" refers to a process for encoding information on the storage device. In one embodiment the population data stored in the storage device to be read by the comparison module is compared, e.g., comparison of input age and ocular measurements with population data to provide age-matched centile parameters for an ocular parameter.

The "comparison system" can use a variety of available software programs and formats for the comparison operative to compare input data with population data and generate an ocular parameter centile parameter for the patient. The comparison module may be configured using existing commercially available or freely available software, and may be optimised for particular data comparisons that are conducted. The comparison module provides computer readable information related to the genotype of the sample. Preferably, the comparison system employs a computational model for comparison purposes.

The comparison module, or any other module of the invention, may include an operating system (e.g., UNIX) on which runs a relational database management system, a World Wide Web application, and a World Wide Web server. World Wide Web application includes the executable code necessary for generation of database language statements (e.g., Structured Query Language (SQL) statements or support for web-accessible statistical analysis software such as Shiny Server that facilitates deployment of R based code (e.g. http://www.rstudio.com/shiny/). Generally, the executables will include embedded SQL statements or other database query languages. In addition, the World Wide Web application may include a configuration file which contains pointers and addresses to the various software entities that comprise the server as well as the various external and internal databases which must be accessed to service user requests. The Configuration file also directs requests for server resources to the appropriate hardware—as may be necessary should the server be distributed over two or more separate computers. In one embodiment, the World Wide Web server supports a TCP/IP protocol. Local networks such as this are sometimes referred to as "Intranets." An advantage of such Intranets is that they allow easy communication with public domain databases residing on the World Wide Web (e.g., the GenBank or Swiss Pro World Wide Web site). Thus, in a particular preferred embodiment of the present invention, users can directly access data (via Hypertext links for example) residing on Internet databases using a HTML interface provided by Web browsers and Web servers. The comparison system is ideally implemented as a computer based API (application programming interface). This allows for a single cloud based comparison system to receive input data from a wide range sources. These include electronic health record systems, a web interface or web/network enabled ocular measurement devices.

The web-based offering of specific embodiments may also provide for end-user customisable implementations (so-called white label services), whereby an end user can provide their own company or medical or optometric practice branding. Web-based solutions may also be used to provide this invention as a function within web-enabled biometric measurement devices (e.g. devices that measure one or more relevant biometric parameter such as refraction, axial length, lens thickness, corneal radius, vitreous chamber depth (VCD), lens power and ALCR ratio). Such devices may communicate ocular biometric parameters, as measured by such a device, to a remote server for analysis and receive back data including the calculated centiles or graphical data with which data in the specified refractogram format can be presented to the user of the device. In an alternative embodiment, the server-based functionality can be embodied within a stand-alone biometric measurement device.

The comparison module typically provides a computer readable comparison result that can be processed in computer readable form by predefined criteria, or criteria defined by a user, to provide a content based in part on the comparison result that may be stored and output as requested by a user using a display system.

In one embodiment of the invention, the refractogram/centogram is displayed on a computer monitor. In one embodiment of the invention, the refractogram is displayed through printable media. The display module can be any suitable device configured to receive from a computer and display computer readable information to a user. Nonlimiting examples include, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) of Sunnyvale, California, or any other type of processor, visual display devices such as flat panel displays, cathode ray tubes and the like, as well as computer printers of various types.

In one embodiment, a World Wide Web browser is used for providing a user interface for display of the content based on the comparison result. It should be understood that other modules of the invention can be adapted to have a web browser interface. Through the Web browser, a user may construct requests for retrieving data from the comparison module. Thus, the user will typically point and click to user interface elements such as buttons, pull down menus, scroll bars and the like conventionally employed in graphical user interfaces.

Exemplification

This invention allows all important growth parameters to be plotted and compared over time on a single chart. In relation to understanding the development of refraction over time and determining the impact of any intervention, this form of chart represents an enhanced graphical centile calculator. Rather than just monitoring centiles, it allows the correlation between different parameters to be easily visualised. A horizontal line for refraction implies that an eye is progressing at a normal, untreated rate. A line inclined upwards over time indicates faster than normal growth. As to whether this would merit with the new myopia control treatments (such as atropine, orthokeratology or other optical devices), an important question is what structures within the eye are contributing to this change. These treatments are designed to slow down axial elongation and therefore are not appropriate if the change in refraction is not due to axial elongation. Plotting refraction and axial length on this form of graph will show if the axial length is contributing to the faster than normal progression. If it is, the lines for both axial length and progression will be inclined upwards over time. If the refraction is inclined upwards, but the axial length growth is normal, this demonstrates that other optical structures are contributing most of this change. Corneal radius is the most easily plotted, and, when plotted as an inverse centile or inverse Z score, will trend in the same direction as refraction if it is contributing to the change in refraction. This may be the case in conditions such as keratoconus or corneal regression following corneal refractive surgery. In both cases, conventional myopia management for progressing myopia would be inappropriate.

Where a myopia control intervention is being used in a patient the visual calculator will allow visual determination of whether the treatment is changing the natural history of the condition. Effective treatment should show a centile (or Z-score) line for refraction trending downwards (i.e. negative slope). If that treatment is having an effect on axial length, that too will show a negative slope. The importance of this feature is that most myopia control treatments have only partial efficacy, so most patients without or without treatment will show refractive progression. Another important factor is that eyes in children also grow as they get older, even when there is no change in refraction. Therefore, what matters most in myopia control is demonstrating slower than the normal growth observed in an untreated patient.

The invention will now be described with reference to specific examples. These are merely exemplary and for illustrative purposes only: they are not intended to be limiting in any way to the scope of the monopoly claimed or to the invention described. These examples constitute the best mode currently contemplated for practicing the invention.

Figure 2:
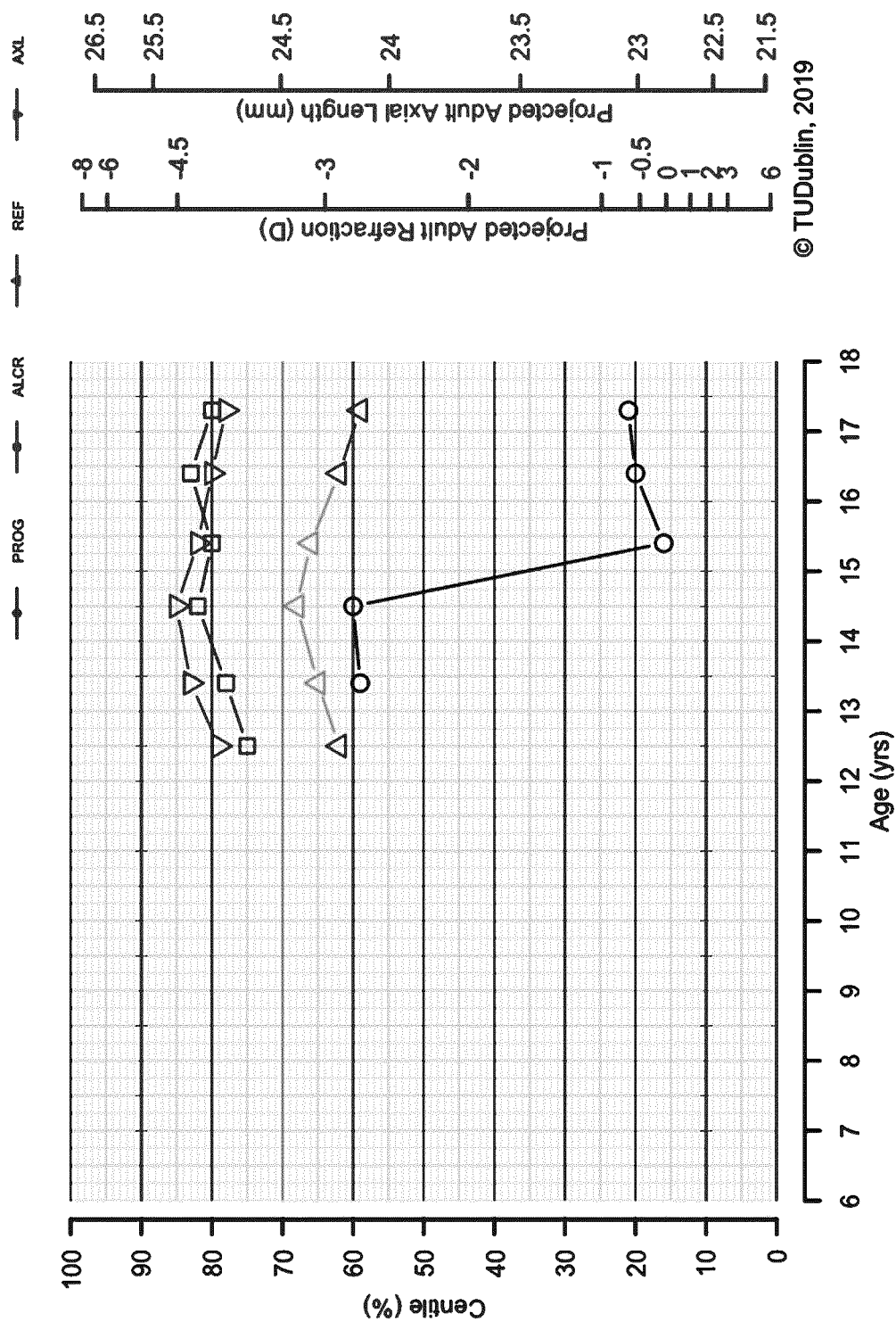
FIG. 2 shows a refractogram with representative centile data representing annualised rate of change of ocular refraction (PROG), ALCR ratio, ocular refraction (REF) and axial length (AXL) for a single subject over five years from 12.5 years to 17.5 years of age during a period where the patient was observed for the first two years and then treated with an intervention to slow down myopia progression from the last three years.
Figure 3:
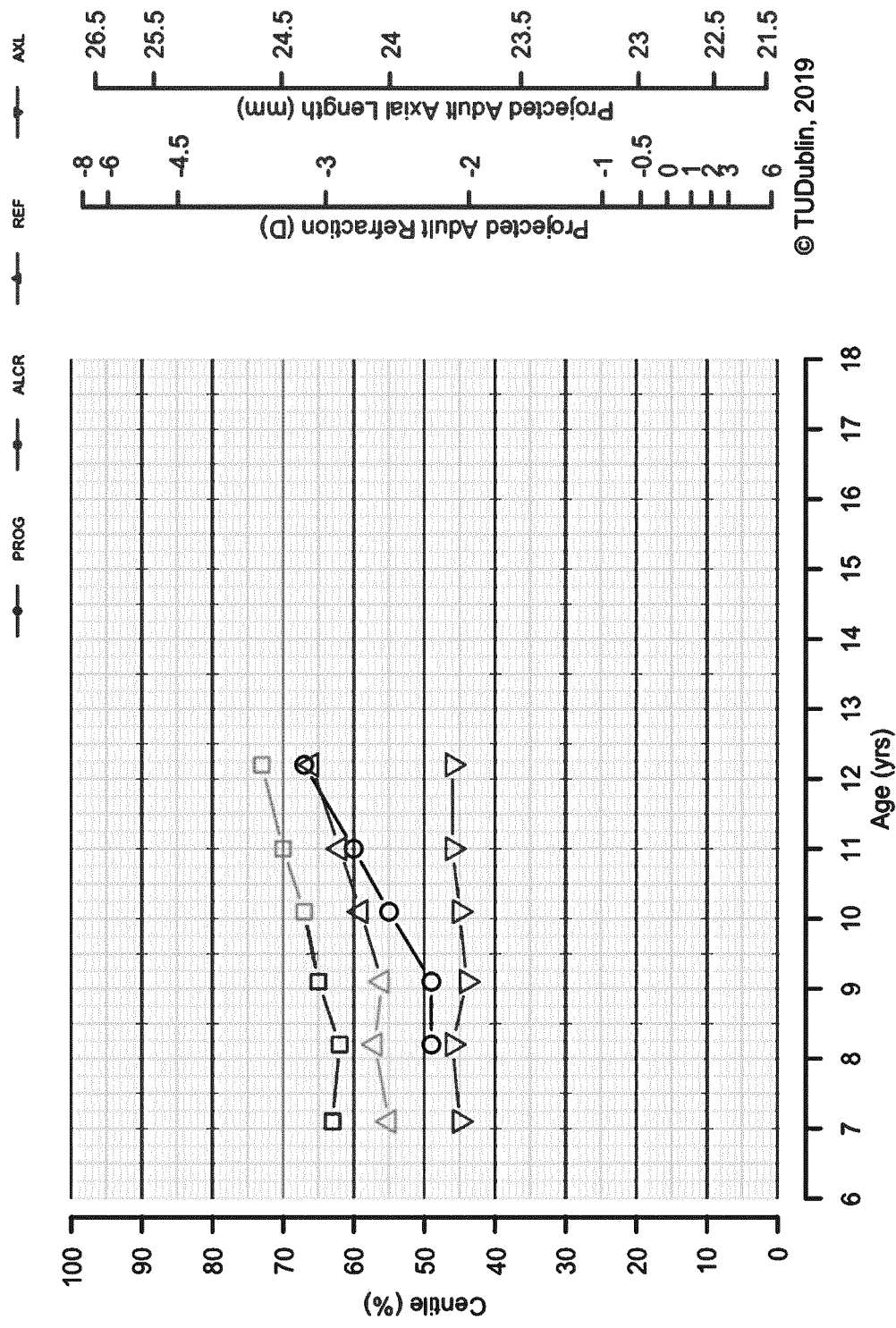
FIG. 3 shows a refractogram with representative centile data representing annualised rate of change of ocular refraction (PROG), ALCR ratio, ocular refraction (REF) and axial length (AXL) for a single subject over five years during a period where the patient was observed.

The value of presenting a range of ocular parameters is demonstrated in FIGS. 1, 2 and 3.

FIG. 1 shows a refractogram with representative centile data representing annualised rate of change of ocular refraction (PROG), ALCR ratio, ocular refraction (REF) and axial length (AXL) for a single subject over three years from 6.5 years to 9.5 years of age during a period of observation. During this time the progression rate was close to the $90^{th}$ centile indicating faster than normal progression. In addition the refraction starts just above the $50^{th}$ centile, but the axial length is at a higher centile and from the red axis on the right it is apparent that on this patients current trajectory they are likely to have an eye with an axial length greater than 26 mm, which is a recognised risk factor for visual impairment in later life. Treatment to slow down progression would be strongly indicated in this case.

As shown in FIG. 1, the right hand side of the graph shows a non-linear scale derived from the population derived cumulative distribution function. A horizontal line drawn (or visualised) on this graph from the final recorded centile (or z-score) to this axis provides a visual means of calculating the final refraction.

As well as representing a visual calculator, the numerical analysis of the input data (i.e. the individual measurements of ocular dimensions and their conversion to centiles and Z-scores) is extended in this invention to create novel indices that can help guide clinicians to make better informed management decisions.

These parameters are:

1) Slope of the centile (or Z-score) lines vs age for each parameter calculated by least squares regression or similar technique. A value of 1 indicates normal growth, a value greater of 1 in a biometric measurement indicates a greater than normal change that will contribute to a myopic shift. A value greater than 1 for refraction indicates faster than normal progression. Depending on the cause of the progression this may indicate treatment is appropriate. A value less than 1 indicates slower than normal growth. In the case of axial length and refractive error, this would suggest successful treatment if a form of myopia control is being used. 2) Ratio of the slope of the refraction (eg. spherical equivalent) vs age line to the slope of the axial length vs age line. A value of 1 (or close to 1) indicates a tight linkage between refraction and axial growth. This is what is expected in axially progressive myopia and would indicate that myopia control treatments may be appropriate in progressing myopia. A value greater than 1 raises the possibility of other causes of myopia than merit investigation.

3) Ratio of the slope of the refraction vs age line to slope of other available parameters. In a rapidly progressive myope, the parameter with the lowest value of this slope ratio parameter is expected to be the dominant factor in the progressive myopia.

FIG. 2 shows a refractogram with representative centile data representing annualised rate of change of ocular refraction (PROG), ALCR ratio, ocular refraction (REF) and axial length (AXL) for a single subject over five years from 12.5 years to 17.5 years of age during a period where the patient was observed for the first two years and then treated with an intervention to slow down myopia progression from the last three years. Prior to treatment the refraction is increasing (PROG centiles) at a slightly faster rate than the population and, as in FIG. 1, this patient has an axial length longer than normal for the refraction (axial centiles are greater than the refraction centiles). Following treatment the progression rate declines markedly and over the next three years, both the refraction and axial length centiles start to decline indicating that the natural history of the myopia has been slowed down and that the final values of refraction and axial length are expected to less than they would have been without treatment. This shows successful treatment, even though the patient is continuing to progress, albeit at a much slower rate.

FIG. 3 shows a refractogram with representative centile data representing annualised rate of change of ocular refraction (PROG), ALCR ratio, ocular refraction (REF) and axial length (AXL) for a single subject over five years during a period where the patient was observed. From 7 years of age to 9, the patient is close to population norms in terms of refraction, progression and axial length. After 9 years of age progression rate, refraction and ALCR ratio change at faster rate than expected while the axial length continues along a normal growth trajectory. This demonstrates that the observed change in refraction is not occurring through the normal mechanism of axial elongation of the eye. The change in the ALCR ratio indicates a change in corneal curvature which would not be expected to occur at such a rate at this age, pointing to possible corneal pathology such as keratoconus.

Centile analysis has recently been applied to ocular refraction and eye growth. Approaches taken are closely aligned with standards long established in childhood growth charts. When a centile or percentile is calculated the lowest value of a growth parameter such as height has the lowest centile and the highest value of a parameter has the highest centile. This principle has been applied in US2018140181A1 patent and in papers cited above.

When analysing biometric variables in order to determine which component of the eye is contributing to a refractive error this leads to the situation that a highly myopic eye will have a very low centile value for spherical equivalent refraction (as this will be a negative number such as −10 dioptres) and a very high centile value for axial length, which is usually increased in myopia. Corneal curvature can be measured either in terms of dioptric power (K values) or as corneal radii (in mm). A myopic eye with a contribution from a highly powered (i.e. highly curved) cornea will have a low centile for refraction, but the centiles for corneal radius will be high and conversely the centiles for keratometry will be low. Biometric values such as anterior chamber depth will also vary inversely with refraction in terms of how they might contribute to the overall refraction of an eye.

The refractogram uses centiles to allow multiple parameters to displayed on a single graph but reverses the direction of certain centiles so that an increasing centile value means that the relevant parameter is contributing more to the resulting refractive error. In this context reversing direction means transforming a centile value with the equation:

new_centile=100−original_centile (where centile is in percent)

or new_centile=1−original_centile (where centile is value between 0 and 1).

The treatment of various parameters when converted to centiles is as follows:
Axial length—conventional
Refraction (e.g. spherical equivalent)—reversed
Progression (dioptre change/year)—reversed
Corneal radius (mm)—reversed
Corneal power (K)—conventional
Anterior chamber depth (mm)—reversed
ALCR ratio (axial length to corneal radius)—conventional
Internal dioptric power (as caculated below, D)—conventional
Anterior lens surface curvature (mm)—reversed
Posterior lens surface curvature (mm)—reversed The importance of this transformation of the conventional centile calculations is that it creates as positive correlation between each biometric centile and the refraction of an eye. In addition to the pattern described above, where refraction is reversed to create 'myopic centiles', the same positive correlation could be achieved with the exact opposite pattern. Without this centile transformation the ability to compare the contribution of different biometric factors to the overall refraction of an eye is lost.

This allows an eye care practitioner to more easily appreciate the refractive implications of a single set of biometric measurements when plotted on a refractogram at a first visit, and to determine how these are changing over time. The higher the centile values the greater the contribution of that biometric parameter to a patients myopia. To justify intervention with treatments designed to limit axial length growth, the axial centile should be higher than other factors that are contributing to the overall refraction of the eye, i.e. corneal radius and internal dioptric power. When plotted over time, a change in refractive centile in progressive myopia should track in parallel with the change in axial centile.

Figure 4:
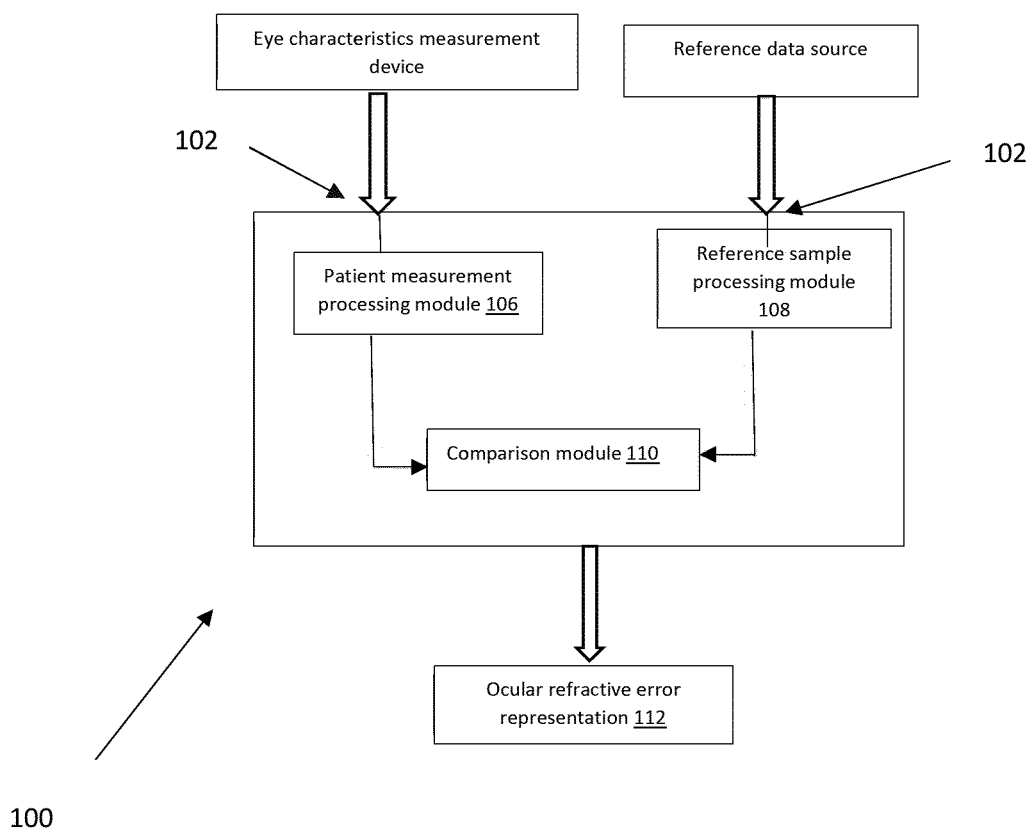
FIG. 4 is a schematic diagram of a system in accordance with the present invention.

FIG. 4 is a schematic representation 100 of an apparatus in accordance with the present invention. The apparatus comprises an input 102 which receives measured values of ocular characteristics from one or more ocular measurement device. The measurement device may be capable of measuring a number of different ocular characteristics and the output may be transmitted to the input 102 of the apparatus 100 by any suitable means.

Data input 104 receives data from a source of reference data which may be pre-loaded. The patient data is transferred from the input 102 to the processing module 106 where it is processed in accordance with one of the examples of the method of the present invention. The reference data is similarly processed in module 108.

Once processed, corresponding data from the patient sample processing module 106 and the reference sample processing module 108 is processed in the comparison module 110 and the output is presented on a graphical user interface connected to the apparatus 100 to characterise the difference between patient ocular characteristics and reference ocular characteristics.

Figure 5:
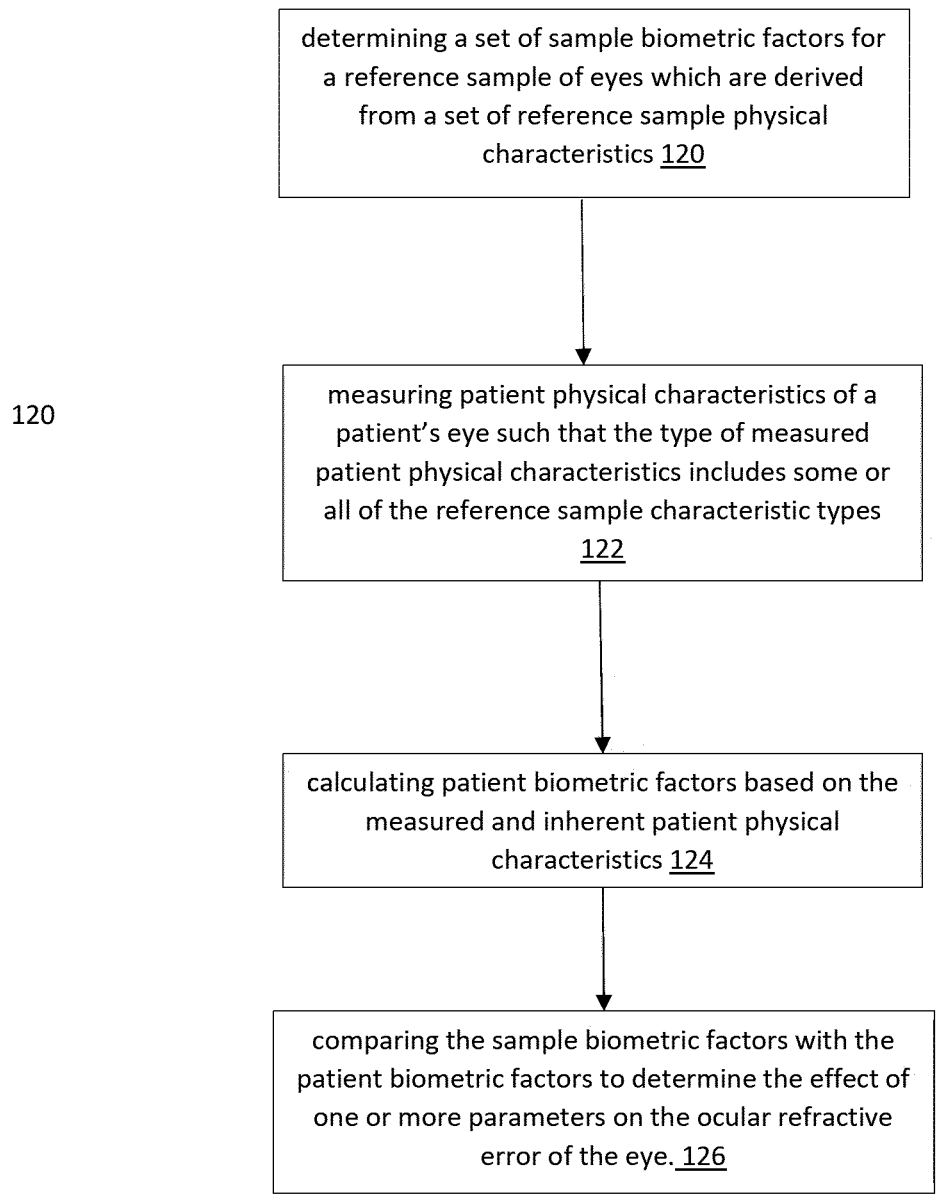
FIG. 5 is a flow diagram which shows the operation of an example of the present invention implemented in software

An example of a method of the present invention which is configured as software which has been uploaded onto the apparatus of FIG. 5 is shown generally in the flowchart 130 of FIG. 5. The method comprises:
determining a set of sample biometric factors for a reference sample of eyes which are derived from a set of reference sample physical characteristics 132;
measuring patient physical characteristics of a patient's eye such that the type of measured patient physical characteristics include some or all of the reference sample characteristic types 134
calculating patient biometric factors based on the measured patient physical characteristics 136
comparing the sample biometric factors with the patient biometric factors to determine the effect of one or more parameters on the ocular refractive error of the eye 138 which is then output in graphical form on a graphical user interface.

The following examples describe a method for calculating and presenting how three biometric factors contribute to refraction of an eye in a patient. The method is enabled using computer software which is integrated into a physical apparatus which includes computing means which is capable of receiving data which describes physical characteristics of a patient's eye, processes the data and compares the processed data with a set of reference values to create an output on a graphical user interface which illustrates and allows calculation of the difference in the extent to which certain biometric factors contribute to refractive error in a patient. In this example, the biometric factors are axial length, corneal curvature/power, and internal dioptric power (IDP) of the eye (i.e. crystalline lens power and position which reflects the anterior chamber depth (ACD)).

The method of the present invention determines, for a given age and gender a representation of a normal or average value for each of these parameters in an eye with no refractive error (i.e. a truly emmetropic eye) and what dioptric power this value represents.

For a given patient, the dioptric power contribution is then calculated for each of these three parameters from the measurements obtained from this patient (i.e. axial length, corneal curvature/power and refraction). The internal dioptric power of the eye is derived from the difference between the overall refraction of the eye and the contributions made by the axial length and cornea. The difference is then calculated between the refractive contribution of the axial length, cornea and internal optics in the patient's eye and the contribution from those factors in 'normal' eye for that age, gender (and population/race if needed). The result can be presented as dioptric power values for each factor (i.e. axial length, cornea and internal optics), as a percentage contribution to the patient's refractive error and graphically as a map ('Refractive Mechanism Map') which provides this information in a format that allows a user to easily compare the relative contribution.

Figure 6:
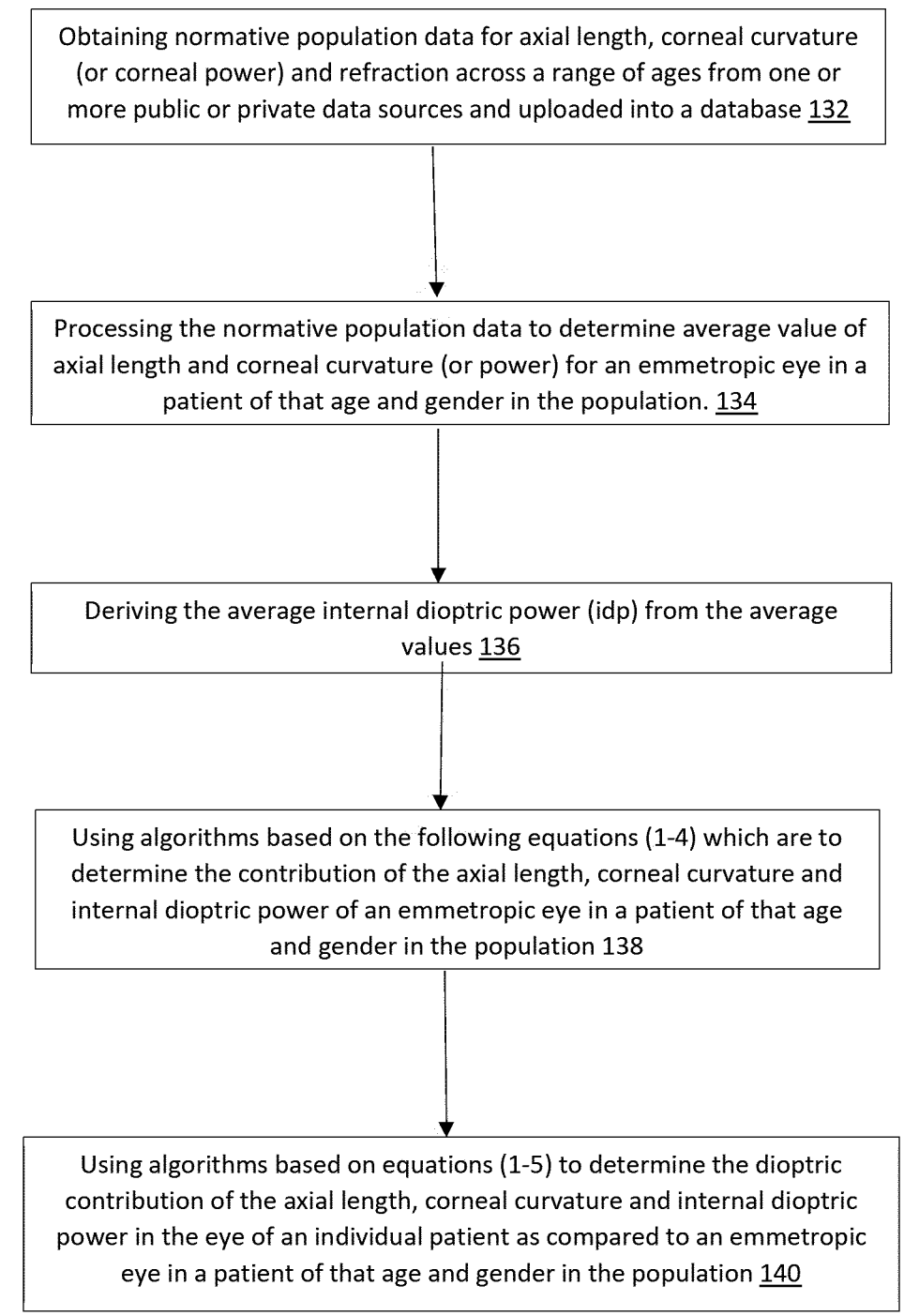
FIG. 6 is a flow diagram which shows the operation of another example of the present invention implemented in software.

FIG. 6 is a flow chart 130, which shows an implementation of the method in accordance with the present invention as implemented using computer software and firmware on a suitable device. The method involves the following steps:

1) Obtaining normative population data for axial length, corneal curvature (or corneal power) and refraction across a range of ages from one or more public or private data sources and uploaded into a database. 132
2) Processing the normative population data to determine average value of axial length and corneal curvature (or power) for an emmetropic eye in a patient of that age and gender in the population.134
3) Deriving the average internal dioptric power (IDP) from the average values 136
4) Using algorithms based on the following equations (1-4) which are to determine the contribution of the axial length, corneal curvature and internal dioptric power of an emmetropic eye in a patient of that age and gender in the population.138
5) Using algorithms based on equations (1-5) to determine the dioptric contribution of the axial length, corneal curvature and internal dioptric power in the eye of an individual patient as compared to an emmetropic eye in a patient of that age and gender in the population. 140

1) Conversion of corneal radius (cr in mm) to Keratometric power (K in dioptres) is performed with the standard equation:

$$K=1000*(corneal\_ref\_index-1)/cr$$

(where the effective corneal refractive index taking into account the posterior surface is corneal_ref_index=1.3375 to 1.3315, see Olsen T. On the calculation of power from curvature of the cornea. Br J Ophthalmol 1986; 70: 152-4.)

2) Determination of the effective refractive index of the eye for the axial length using a custom equation. This uses averaged refractive indices for the cornea, aqueous/vitreous and lens (example values below):

$r_c$=1.3765 (averaged actual corneal refractive index, as distinct from the effective corneal refractive index used above)
$r_l$=1.405 (averaged lens refractive index)
$r_a$=1.335 (averaged aqueous/vitreous refractive index)
cct=central corneal thickness (mm)
lt=lens thickness (mm)
axl=axial length (mm)

$$\text{effective\_refractive\_index}=(cct*r_c+lt*r_l+(axl-cct-lt)*r_a)/axl$$

This calculation is most accurate when cct and lt are measured, but if not available average population values can be used.

3) The effective refractive index and axial length is used to calculate the dioptric power at the corneal vertex (sercv) required to bring the retina into optimal focus.

$$sercv=1000*\text{effective\_refractive\_index}/axl$$

4) The internal dioptric power (idp) of the eye is derived by converting the measured spherical equivalent refraction (ser) to the equivalent vertex power (sercv) and then determining the difference between this value and the dioptric power required by the axial length at the corneal vertex and the dioptric power contributed by the cornea (K) as follows as a function of vertex to spectacle plane distance in mm (vertex, which defaults to a value of 13.75 mm if not specified):

$$sercv=ser/(1-(ser*vertex/1000))$$

$$idp=(\text{effective\_refractive\_index}*1000/axl)-K-sercv$$

5) The contribution to the refraction in a patient's eye from axial length (contrib_axl), cornea (contrib_K) and internal dioptric power (contrib_idp) is then calculated as follows as the difference between the axial, corneal and internal dioptric power of the patient and that of an emmetropic eye for someone of that age, gender and population (emm_axl, emm_K and emm_idp respectively):

$$contrib\_axl=(1000*refindex/axl)-(1000*refindex/emm\_axl)$$

$$contrib\_K=emm\_K-K$$

$$idp=(\text{effective\_refractive\_index}*1000/axl)-K-ser/(1-(ser*vertex/1000))$$

$$contrib\_uop=emm\_idp-idp$$

Each value (contrib) is then converted to dioptric power in the spectacle plane (ser) at a specified distance from the corneal vertex (vertex_distance) to allow direct comparison with the clinically measured refraction.

$$ser=contrib/(1+(contrib*vertex\_distance/1000))$$

The spectacle plane contribution of each factor can then be reported in terms of dioptres or as a percentage of the contribution to a myopic refraction to more clearly describe the contribution of each factor to the overall refraction of an eye.

The output of this embodiment of the present invention is provided graphically on a graphical user interface of a computing device, which could be a dedicated ophthalmology device which is capable of measuring the physical parameters of the patient's eyes, comparing the processed measured values with normative data and presenting the results on a graphical user interface. By providing an analysis of physical data derived from measurements of a patient's eye, the results may be used to assist an optometrist in determining a course of treatment for a patient.

Such a stand-alone device should also have the ability to receive software and data updates.

The graphical user interface can be programmed to represent the calculations on a graph plotting age against dioptric contribution showing the values of each contributory factor at a given time or over several visits. At a single visit the results can be presented in the form of a three-parameter radar plot showing the dioptric value of each factor compared to an emmetropic eye for someone of that age, gender and population.

Figure 7:
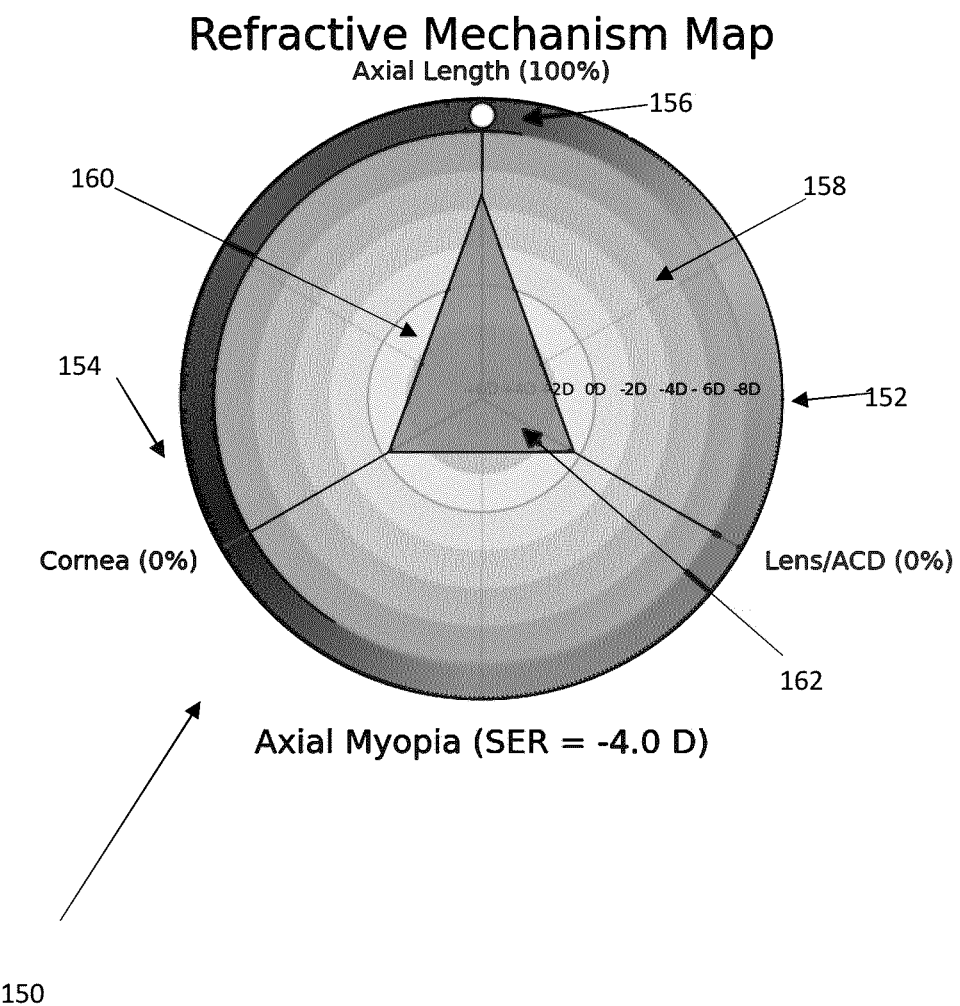
FIG. 7 is a radar plot presented as an output on a graphical user interface which shows values of refraction, average K values, axial length and internal dioptric power (labelled as Lens/ACD, which are the dominant anatomical contributors to internal dioptric power) for a patient.

The following examples show the use of the method of the present invention as embodied on suitable computing means, such as a PC, tablet or smartphone. The examples are based on normative data from the Anyang Childhood Eye Study in 14 year old girls from China. FIG. 7 is a three parameter radar plot which has been created using the method of the present invention and displayed on the graphical user interface of the device. The radar plot shows a patient with a refraction of −4D, average K values of 42, axial length of 25.5 and lens thickness of 3.57. The plots of FIGS. 7 to 10 are colour plots as shown in FIG. 7 for reference, the plot 150 has an outer band which shows a spectrum of colours with green 152, blue 154 and red 156 areas. Concentric red concentric bands 158 lighten in shade towards the centre 160 which comprises a lighter green concentric band and a darker green centre.

The calculations processed on the computing device using of the above method shows an eye with axial myopia where all of the myopia can be attributed to axial elongation. In these representations the area of the triangle relates to the ocular refraction, the colour of the triangle indicates the dominant mechanism of the myopia (i.e. axial, corneal or lens/acd) as indicated by the outer ring. In the case where there is equal contribution to the refraction the colour becomes white. The dominant refractive mechanism is also represented by the white circle in the outer ring. The contribution of each factor is represented by the distance of the vertex of each triangle from the centre, with increasing distance indicating increasing myopia (as can be read off the concentric dioptric lines).

Figure 8:
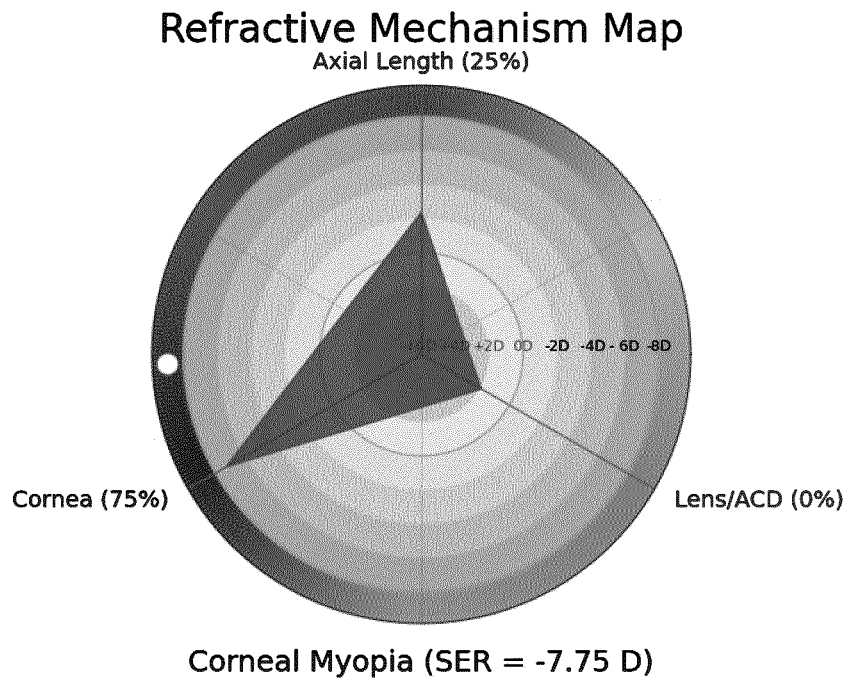
FIG. 8 is a radar plot presented as an output on a graphical user interface which shows values of normal cornea power, axial length and internal dioptric power (labelled as Lens/ACD which are the dominant anatomical contributors to internal dioptric power) for a patient.

FIG. 8 shows an eye with significant myopia (ser=−7.75 D), higher than normal cornea power (K=49.0D), axial length of 24.5 and lens thickness of 3.8 mm due to keratoconus (a corneal disorder).

Figure 9:
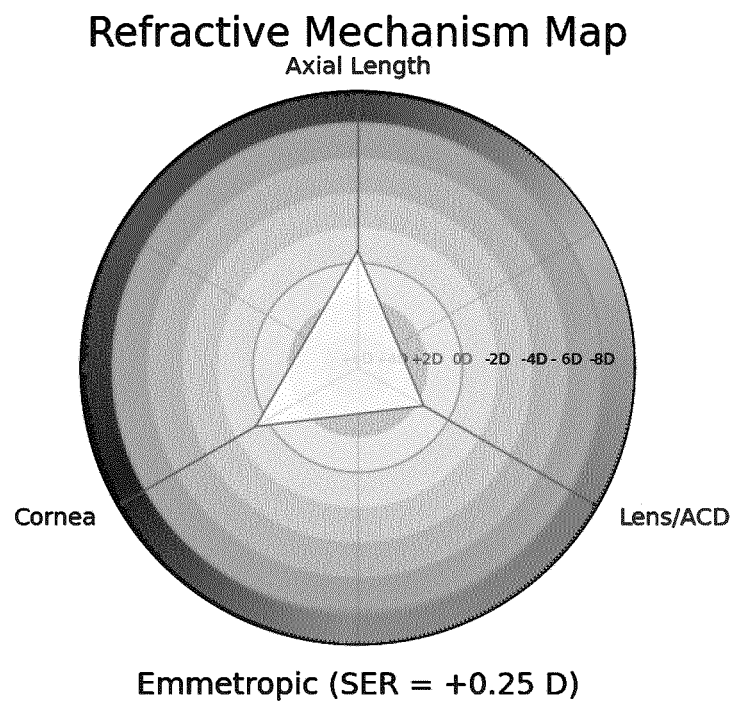
FIG. 9 is a radar plot presented as an output on a graphical user interface which shows an emmetropic eye.

FIG. 9 demonstrates an emmetropic eye (i.e. with refraction in the range >−0.5 D and <+0.75 D).

Figure 10:
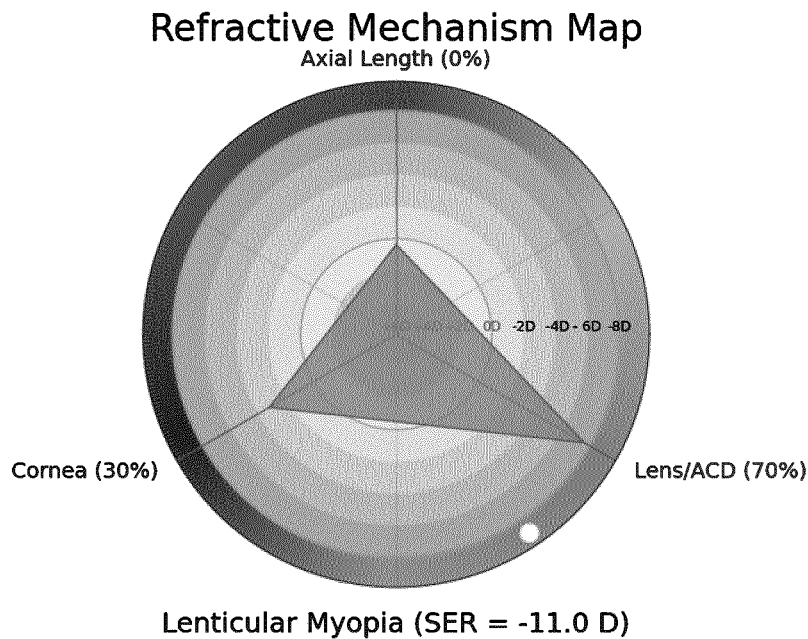
FIG. 10 is a radar plot presented as an output on a graphical user interface which shows a myope where the myopia is predominantly due to increased internal dioptric power (as above, labelled as Lens/ACD).

FIG. 10 shows a myope where the myopia is predominantly due to increased internal dioptric power (i.e. attributable to the lens power and/or anterior chamber depth), due in this example to prematurity (ser=−11.0 D, average K=45.41, axial length=23.36, lens thickness=4.13).

Implementation

This embodiment of the method of the present invention requires as inputs to the calculation one or more patient related parameters (e.g. sex/gender, age, geographical population and race) and one or more ocular measurements (refraction, corneal curvature, corneal power, axial length, lens parameters, corneal thickness).

These parameters may be obtained from a single clinical device or measured using clinical techniques such as retinoscopy or subjective refraction. These parameters may be measured in real-time or previously obtained measurements from paper records, device printouts, electronic health records or other databases).

Where these parameters exist in digital form they are transmitted in a manner that preserves patient confidentiality to the device API (application programming interface) as part of a request that requests a particular computational transformation or calculation to be performed. Where these parameters exist in physical documentation or from various sources, they need to be converted into digital form by scanning and optical character recognition (OCR) or via a user interface. This may be a web interface or an interface (e.g. touch screen) on a dedicated device. This device may also directly measure some of these parameters and require input of those parameters or patient attributes not already stored on the device. Whichever of these approaches are adopted, the parametric data and the type of request are transmitted to a single API.

On receipt, the API authenticates this is a valid request and then processes the request. The output of this process can be a specific value in machine readable format such as JavaScript Object Notation (JSON), eg. the centile value for a single biometric parameter for a patient with specified attributes (age, gender etc), as per the following definition.

API Endpoint: getCentile
API: get population matched centile for a given parameter Example(s)

<api_url>/getCentile?apikey=xxxxxxx&parameter=axl&gender=male&value=24.3&age=12
Parameters
  apikey (string)—API key
  parameter (string)—Descriptor of biometric parameter. One of:
    ser—spherical equivalent
    cyl—cylindrical power
    prog—annualised refraction (ser) change
    cr—corneal radius
    acd—anterior chamber depth
    alcr—axial length:corneal radius (ALCR) ratio
    axl—axial length
  gender (string)—male or female
  value (string)—parameter value
  age (string)—age in years
Response
  200 code response: {"centile": "85.07", "parameter": "axl"}
  401 code response: ("result": "Invalid API Key")
Return Type
  json The request may also be for a graphical representation of multiple biometric values from more than one visit in the form of html code for an interactive refractogram that can displayed on a user's device/screen. Similar API requests can specific the same graph rendered in a digital graphics format such as JPEG, png or pdf document.

API Endpoint: Rfg
  API: Create Interactive refractogram in HTML
  Accepts data from one eye or both eyes. Parameter values are optional as it will adapt and create plot on the basis of available data but needs at least two visits to calculate progression data Example(s)

<api_url>/rfg?raxl=21.7%2C22.2%2C23&age=9.5%2C10.4%2C11.6&rser=-2%2C-2.5%2C-3.24&rcr=7.8%2C7.85%2C7.8&gender=male&apikey=xxxxxx&laxl=21.6%2C22.2%2C23.2&lser=-2.3%2C-2.8%2C-3.5

Figure 11:
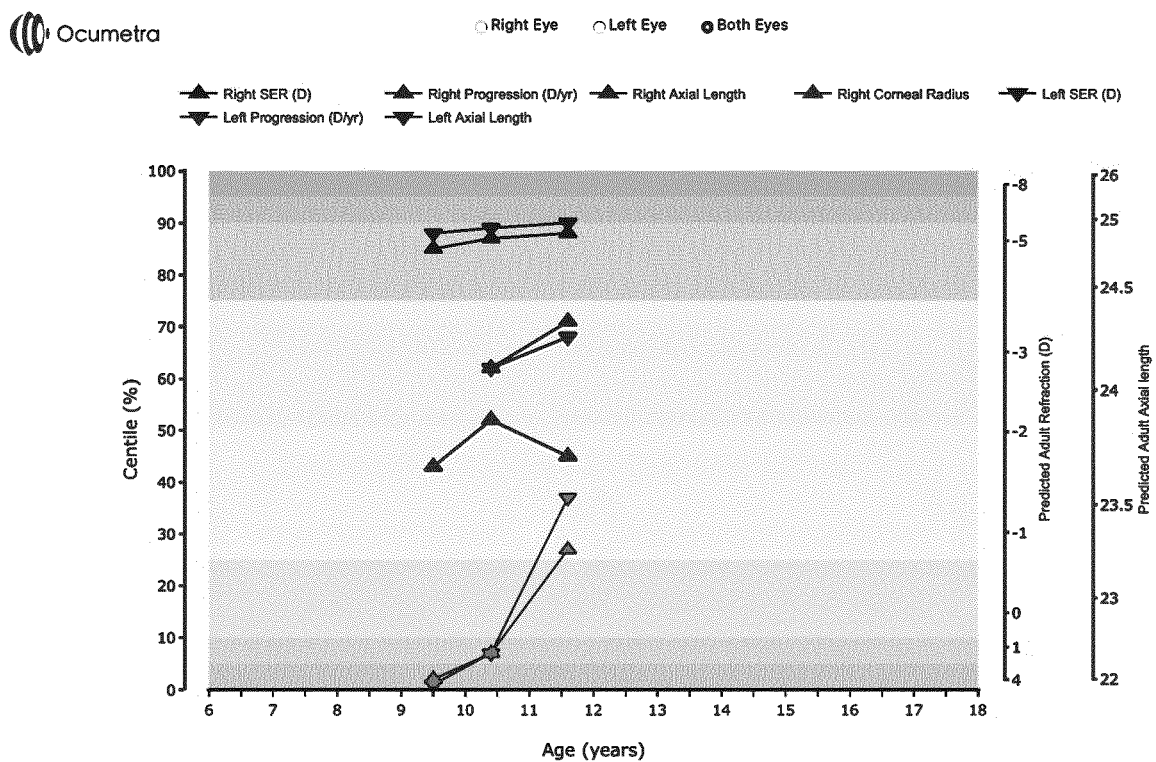
FIG. 11 illustrates a visual representation of calculated values such as centile values for each parameter and indices of treatment efficacy.

Parameters
  apikey (string)—API key
  age (urlencoded comma delimited list as string)—ages at each visit
  rser (urlencoded comma delimited list as string (optional))—right spherical
Equivalent at Each Visit (D)
  raxl (urlencoded comma delimited list as string (optional))—right axial length at each visit (mm)
  rcr (urlencoded comma delimited list as string (optional))—right corneal
Radius at Each Visit (Mm)
  lser (urlencoded comma delimited list as string (optional))—left spherical equivalent at each visit (D)
  laxl (urlencoded comma delimited list as string (optional))—left axial length at each visit (mm)
  lcr (urlencoded comma delimited list as string (optional))—left corneal radius at each visit (mm)
  gender (string)—male or female
  age—ages at each visit
Response
  Complete html file of interactive graph for inclusion in iframe or other use, e.g.
Return Type
  html The request may also process multiple parametric values and return a visual dashboard which includes a number of calculated values such as centile values for each parameter and indices of treatment efficacy as shown in FIG. 11

Figure 12:
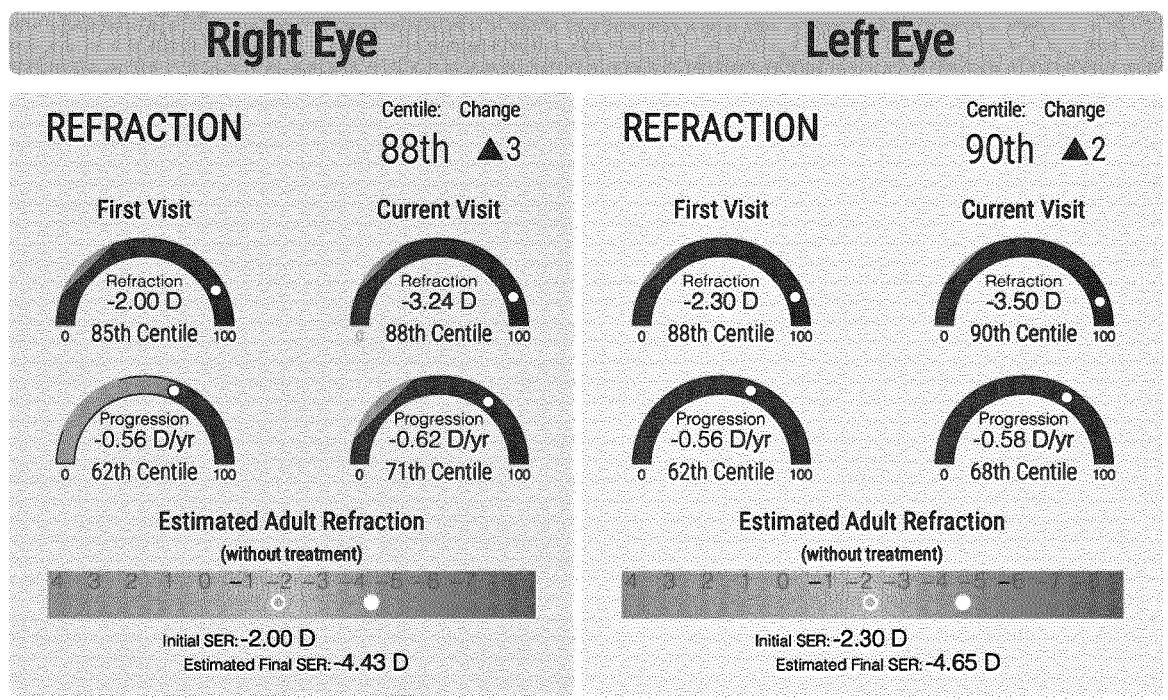
FIG. 12 illustrates a graphical user interface/API endpoint implemented as a dashboard.

FIG. 12 shows the graphical user interface/API endpoint implemented as a: dashboard
  API: Create Visual Dashboard of Refractive data in HTML
  Accepts data from one eye or both eyes, but needs at least two visits to calculate progression index Example(s)

Parameters
  apikey (string)—API key
  age (urlencoded comma delimited list as string)—ages at each visit
  rser (urlencoded comma delimited list as string (optional))—right spherical equivalent at each visit (D)
  raxl (urlencoded comma delimited list as string (optional))—right axial length at each visit (mm)
  rcr (urlencoded comma delimited list as string (optional))—right corneal radius at each visit (mm)
  lser (urlencoded comma delimited list as string (optional))—left spherical equivalent at each visit (D)
  laxl (urlencoded comma delimited list as string (optional))—left axial length at each visit (mm)
  gender (string)—male or female
  age—ages at each visit
Response
  Complete Html file for inclusion in an iframe or other use
Return Type
  html Representative Example List of Endpoints Currently within the API:
API Endpoint: getCentile
  API: get population matched centile for a given refractive and biometric data parameter
API Endpoint: refEfficacy
  API: Estimate treatment efficacy for change in spherical equivalent over time. Two indices of efficacy are provided, one where the comparison is made with a matched reference data for emmetropic eyes and one where comparison is made with matched reference data for eyes of the same based line refractive error as the patient.
API Endpoint: axlEfficacy
  API: Estimate treatment efficacy for change in spherical equivalent over time. Two indices of efficacy are provided, one where the comparison is made with a matched reference data for emmetropic eyes and one where comparison is made with matched reference data for eyes of the same based line refractive error as the patient.
API Endpoint: Progression
  API: progression percentage comparing observed to expected progression level for given refractive and biometric data parameter
API Endpoint: Progindex
  API: Get progression index for given refractive and biometric data parameter
API Endpoint: getEndpoint
  API: Get prediction for a final biometric value based on current centile
API Endpoint: rfg
  API: Create Interactive refractogram of refractive and biometric data in HTML or graphic file format
API Endpoint: Dashboard
  API: Create Visual Dashboard of refractive and biometric data in HTML or graphic file format
API Endpoint: Bioplot
  API: Plot refractive and biometric data on a population and gender matched centile chart in HTML or graphic file format
API Endpoint: Mechanism_Map
  API: Plot refractive and biometric data on a population and gender matched centile chart in HTML or graphic file format
API Endpoint: Mechanism_Calculation
  API: Receives biometric data including refraction, axial length and corneal curvature (or corneal power) and patient demographic data. Returns the contribution to the refraction error from the corneal, axial length and internal optics (i.e. lens) in terms of dioptres and as a percentage of the refractive error.

In implementing the present invention, the more biometric measures available the more accurate the assessment of biometric status. However, in practical term data may be available from just a single or a small number of consultations where measurements of the patients eyes are taken. Data collected over time may include periods of observation and periods of active treatment for comparison. The following describes examples of the use of the computer hardware and the software implemented method of the present invention in which the indices calculated from ocular biometric measurements combined with other patient related factors can be applied to these different clinical scenarios.

Single Visit Analysis—Refraction Only

If only refraction is available, additional data can be obtained from the patient by clinical history or existing clinical records. This data must include age and gender. Ideally it also includes geographical location, parental refractive history.

The refraction for each eye is converted in myopic centiles (i.e. reversed) and can be plotted on the refractogram. This allows the visual calculation of the likely adult refraction on the basis centile tracking. In the case of a 7 year old child who is not myopic, the risk of developing myopia at a specific age can be calculated by comparing their current centile value with the myopic centile corresponding to a spherical equivalent refraction of <=−0.5 dioptres (the conventional threshold definition of myopia) at that age. This latter value (as a percentage) corresponds to (100−the gender-specific prevalence of myopia of myopia in that population). In the currently implemented population database for this invention, the prevalence of myopia in European/US populations is 36.1% for males and 36.8% for females at age 16. The corresponding myopic centiles are 63.9% for males and 63.2% for females.

For a 7 year old boy the 63.9% refraction centile (using the reversed scale of this invention) represents a refraction of +0.82D. At 7 years of age, the myopic threshold of −0.5D represents the 96.6% centile. Therefore at 7 years of age the centile risk zone for developing myopia by 16 years of age is between the 63.9% and 96.6% centiles. This pre-myopic zone can marked on the refractogram to allow the user of the refractogram to identify those at developing myopia by plotting the centile value on the graph, or by entering the source data (refraction, age, gender) into a device that has a computer implementation of this algorithm. As the prevalence of myopia varies by gender (to small degrees) and geography, this algorithm provides a more accurate means of identifying premyopia than just providing a refractive threshold as has been recommended. In 2015 for example, a single (non-gender specific, or population specific) value of refraction was recommended as the best method of detecting future myopia (Zadnik K, Sinnott L T, Cotter S A, et al. Prediction of juvenile-onset myopia. JAMA Ophthalmol 2015; 133: 683-689.)

The same approach can be used to determine the risk of any other threshold of myopia, e.g. high myopia (<=−6.0D), or a level of myopia amenable to corneal refractive surgery depending on other clinical features such as corneal thickness. The projected final refraction can also be used to calculate the risk of future visual impairment due to myopia (and its complications) using available population-specific prevalence figures for visual impairment as a function of refractive error.

Single Visit Analysis—Refraction and Keratometry Only

Measurements of corneal curvature are available on many automated refractors. This additional data allows for additional indices to be calculated and plotted on the refractogram.

The main additional factor that can be calculated in this situation is an estimated axial length. Axial length measurement devices are not commonly available in many eye care environments, but it is a parameter of great significance in managing refractive errors.

This estimation is useful in determining future visual impairment as a function of axial length. The current methods do not take other patient and ocular factors into account. With the current invention, the population biometric data and patient demographic and history data are used to provide a more accurate estimation. The caret package in the R programming system (short for Classification And REgression Training) allows for the generation of models from large volumes of source data. With a comprehensive data of biometric data, as have been recorded in numerous research studies, it possible to create models that provide significantly better estimation of axial length. Non-linearities can be included by pre-processing a variable with a non-linear operator. In this case, including the logarithm of age provides additional estimation accuracy. The parameter of one such model are included below.

| Residuals: | | | | |
|---|---|---|---|---|
| Min | 1Q | Median | 3Q | Max |
| −1.43506 | −0.19911 | 0.00131 | 0.17871 | 1.58931 |

| Coefficients: | | | | |
|---|---|---|---|---|
| | Estimate Std. | Error | t value | Pr(>|t|) |
| (Intercept) | 2.160348 | 0.391128 | 5.523 | 4.01e−08 *** |
| gender | −0.165803 | 0.019138 | −8.664 | <2e−16 *** |
| ser | −0.357518 | 0.005883 | −60.772 | <2e−16 *** |
| cr | 2.093292 | 0.034160 | 61.279 | <2e−16 *** |
| log(age) | 1.189923 | 0.178221 | 6.677 | 3.61e−11 *** |
| age | −0.054382 | 0.015250 | −3.566 | 0.000376 *** |
| acd | 0.756672 | 0.038191 | 19.813 | <2e−16 ** |
| myopicparents | 0.049480 | 0.014575 | 3.395 | 0.000707 *** | myopicparents = number of myopic parents in range 0, 1, 2
ser = spherical equivalent refraction (D)
cr = corneal radius (mm)
acd = anterior chamber depth (mm)

When applied to a separate dataset than used for the machine learning training where the actual axial length was available, the residual errors had a mean absolute error of 0.24 mm (approximately 1%) and a standard deviation of 0.32 mm. Within the invention a range of such models are implemented that allows for incomplete data sets, for example where anterior chamber depth or the number of myopic parents values are not available. For example, the model derived from refraction, corneal curvature, age and gender has a mean absolute error of 0.30 mm. This allows for a practitioner to input the data they have available and get an estimated value, but the more data entered the more accurate the prediction. Using the conventional approach of just using corneal radius and refraction, the mean absolute error increases to 0.37 mm. Hence the approach in this invention provides up to a 35% improvement in accuracy.

The precision of this estimation is sufficient to be used to estimate future visual impairment and to risk stratify subjects who may benefit from myopia control. For a given refraction, the patient with the longest axial length is potentially at greatest risk of later visual impairment, hence a stronger case exists for intervention with a myopia control strategy.

Axial length can also be estimated using the calculations that contribute to the Myopia Mechanism Map. For a patient of a given age and gender, the matched distribution of internal dioptric power (IDP) is calculated from the reference population data as described above. The refraction and corneal curvature are known input variables derived from measurements of the patient's eye, therefore the potential distribution of possible axial length values can be calculated.

This provides for a mean value and confidence intervals to be defined from the calculated probability distribution function.

The estimated axial length can also be used to create an estimated ALCR ratio (axial length/corneal radius) which is a useful predictive factor in some published models of myopic The estimated axial length can also be used as an input (along with refraction, corneal radius, age and gender) into the algorithm for generating the refractive mechanism parameters allowing (with a precision determined by the model used) estimation of the contribution of axial length, cornea and lens to a patient's myopia.

This model can also be used to estimate population distributions of axial length (and hence centiles) from datasets where this parameter is missing with estimation that can approach, or theoretically exceed, that obtained from samples of axial length measurements. From the training step of the algorithm, a distribution of residual errors are generated. When a population histogram is generated from the estimated axial length values, this represents only a proportion of the actual variance of the population. This missing variance is captured within the distribution of the residual errors. To create a more accurate estimate of the population distribution, the histogram of the estimated can be convolved with a set of weighted values (i.e. a kernel) that represents the distribution of these residual errors. This can also be achieved by Montecarlo simulations. In this case the residuals are treated as a probability distribution function and multiple samples are created where a random error based on this probability distribution is added to the estimated axial length. The distribution of the resulting values represents an estimate of the true population.

Where more comprehensive sets of biometric data are available, the present invention may be used to create output data in the form of graphically presented estimates and predictions higher accuracy. In particular the availability of age, gender, refraction, corneal radius and axial length provides for a complete characterisation of the contributory factors to a patients refractive error via the myopia mechanism algorithm.

The above indices can help an eye care practitioner make better informed decisions about myopia management at a single visit. The same indices are also very valuable in tracking changes in an eye over multiple visits. Additional indices that are available on multiple visits include estimate of the rate of change of refraction and axial length as compared to the reference population as progression indices. This provides much more useful information for an eye care practitioner than just the actual change, since normal eyes in children will be undergoing growth related changes that vary by age and gender. A change of 0.2 mm in axial length over a year in a young child can represent normal growth. With increasing age, a greater proportion of the observed increase in axial length is attributable to myopic progression in the case of an axially myopic eye.

Emmetropic Progression index (EPI)=(biometric change over time period)/(expected change for an emmetropic eye of the same age and gender)

Refractive Progression index (MPI)=(biometric change over time period)/(expected change for an eye of the same age and gender and refraction)

For both of these indices, a value of 1.0 represents either normal growth for the emmetropic progression index or typical myopic progression/growth for the refractive progression index. A value higher that 1.0 indicates faster than normal growth and a value less than 1.0 slower growth. The RPI allows identification of patients who are progression faster than normal and may merit treatment. It also allows assessment of whether an intervention is likely to be having an effect. An RPI of <1.0 in a treated patient suggests an effective intervention. A reduction in RPI from a pretreatment period to a treatment period provides more compelling evidence of efficacy of treatment. The EPI provides a measure of how effective that treatment is. An EPI of 1.0 indicates that a patient is now showing eye growth which should be the target of intervention. An EPI can also be less than 1.0 indicating that a growth has been suppressed. Both the RPI and EPI can be expressed as a percentage if desired.

The expected change for an emmetropic (i.e. normal eye) or refraction matched eye is derived from the centile database on the assumption of centile tracking.

Treatment efficacy in clinical trials of myopia control is currently calculated in an inaccurate manner as it presents the observed axial length change over time in the treated group expressed as a percentage of the untreated control group. It may also be presented as the absolute difference. i.e. the difference in axial elongation between the treated group and the control group expressed as dioptres/year. This standard approach, used in all recent clinical trials of myopia interventions, fails to take into account normal, non-myopic eye growth. This is particularly an issue in young children. Using our current population database model and algorithms, a normal 6 year-old boy has an estimated axial length of 22.58 mm. By 8 years of age the expected axial length is 23.04. Therefore 0.46/2=0.23 mm of growth would be expected between 6 and 8 years of age. If the control group in a myopia treatment trial were showing a change of 0.38 mm per year and the treatment group showing a change of 0.28 mm per year, this would currently be described as a percentage treatment efficacy of 26% or 0.1 mm in absolute terms.

This provides for a new index of treatment efficacy for clinical trials:

Treatment Efficacy Index (TEI)=100*(1−([(biometric change over time period in treatment group)−(biometric change expected in an age and gender matched emmetropic eyes over time)]/[(biometric change over time period in control group)−(biometric change expected in an age and gender matched emmetropic eyes over time)])

In the present invention and emmetropic progression index values in the treated group is 1.22 and 1.65 in the control group, and the TEI indicates the treatment is controlling 66% of the axial elongation that can be attributed to myopic progression.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimed is:

1. A computer implemented method for analysing ocular refractive error of an eye, the method comprising:
    determining a set of sample biometric factors for a reference sample of eyes which are derived from a set of reference sample physical characteristics;
    measuring patient physical characteristics of a patient's eye such that the type of measured patient physical characteristics include some or all of the reference sample characteristic types;
    calculating patient biometric factors based on the measured and inherent patient physical characteristics; and
    comparing the sample biometric factors with the patient biometric factors to determine the effect of one or more parameters on the ocular refractive error of an eye, wherein comparing the sample biometric factors with the patient biometric factors further comprises separately calculating the difference between the refractive contribution of the axial length, cornea and internal optics in the patient's eye and the contribution from those factors in the sample physical characteristics.

2. The computer implemented method as claimed in claim 1 wherein the measured physical characteristics comprise at least one of axial length, corneal curvature/power and refraction.

3. The computer implemented method as claimed in claim 1 wherein the result of calculating the difference between the refractive contribution is described by means of dioptric power for each factor as a percentage contribution to the patient's refractive error.

4. The computer implemented method as claimed in claim 3 wherein the dioptric power contribution is calculated separately for each of the biometric factors from the patient measured physical characteristics.

5. The computer implemented method as claimed in claim 3 wherein the internal dioptric power (IDP) of the eye is calculated from the difference between an overall refraction of the eye and the contributions made by the axial length and corneal curvature/power.

6. The computer implemented method as claimed in claim 1 wherein the inherent patient physical characteristics comprise age and/or gender of patients.

7. The computer implemented method as claimed in claim 1 wherein the sample biometric factors represent a normal or average value for each of these factors for the reference sample.

8. The computer implemented method as claimed in claim 7 wherein the sample biometric factors represent a normal or average value for each of these parameters in an eye with no refractive error, an emmetropic eye and the associated dioptric value.

9. The computer implemented method as claimed in claim 1 wherein the sample biometric factors include axial length, corneal curvature/power and internal dioptric power (IDP) of the eye.

10. The computer implemented method as claimed in claim 1 wherein determining a set of sample biometric factors for a reference sample of eyes comprises:
    obtaining normative population data for axial length, corneal curvature (or corneal power) and refraction across a range of ages;
    using the normative population data to determine average value of axial length and corneal curvature (or power) for an emmetropic eye in a patient of that age and gender in the population;
    deriving the average internal dioptric power; and
    determining the contribution of the axial length, corneal curvature and internal dioptric power to the refractive power of an emmetropic eye in a patient of that age and gender in the population.

11. The computer implemented method as claimed in claim 1 wherein calculating patient biometric factors based on the measured patient physical characteristics comprises:
    calculating the contribution to the refraction in a patient's eye from axial length, cornea and internal dioptric power; and
    converting each value to dioptric power in the spectacle plane (ser) at a specified distance from the corneal vertex to allow direct comparison with the clinically measured refraction.

12. The computer implemented method as claimed in claim 1 wherein the ocular refractive error is presented graphically on a graphical user interface as a map.

13. The computer implemented method as claimed in claim 12 wherein the ocular refractive error is presented graphically as a graph plotting age against dioptric contribution showing the values of each contributory factor after a single measurement.

14. The computer implemented method as claimed in claim 12 wherein the result is presented graphically in the form of a three-parameter radar plot showing the dioptric value of each factor compared to an emmetropic eye for someone of that age, gender and population.

15. The computer implemented method as claimed in claim 12 wherein the result is presented graphically as a graph plotting age against dioptric contribution showing the values of each contributory factor after a plurality of time separated measurements.

16. The computer implemented method as claimed in claim 12 wherein the results are presented as a graph plotting age against dioptric contribution showing the values of each contributory factor at each of the time separated measurements.

17. A computer system comprising hardware, software and firm ware for implementing the method of claim 1.

18. A computer program product comprising a non-transitory computer-readable medium with program instructions stored thereon for causing a computer to perform a method comprising:
    determining a set of sample biometric factors for a reference sample of eyes which are derived from a set of reference sample physical characteristics;
    obtaining inherent patient characteristics and measuring patient physical characteristics of a patient's eye such that the type of measured patient physical characteristics include some or all of the reference sample characteristic types;
    calculating patient biometric factors based on the measured patient physical characteristics;
    comparing the sample biometric factors with the patient biometric factors to determine the effect of one or more parameters on the ocular refractive error of the eye, wherein comparing the sample biometric factors with the patient biometric factors further comprises separately calculating the difference between the refractive contribution of the axial length, cornea and internal optics in the patient's eye and the contribution from those factors in the sample physical characteristics.

19. The computer program product as claimed in claim 18 embodied on a record medium as a carrier signal or on a read only memory.

20. A computer implemented method for analysing ocular refractive error of an eye, the method comprising:

determining a set of sample biometric factors for a reference sample of eyes which are derived from a set of reference sample physical characteristics;

measuring patient physical characteristics of a patient's eye such that the type of measured patient physical characteristics include some or all of the reference sample characteristic types;

calculating patient biometric factors based on the measured and inherent patient physical characteristics; and comparing the sample biometric factors with the patient biometric factors to determine the effect of one or more parameters on the ocular refractive error of an eye, wherein determining a set of sample biometric factors for a reference sample of eyes comprises:

obtaining normative population data for axial length, corneal curvature (or corneal power) and refraction across a range of ages;

using the normative population data to determine average value of axial length and corneal curvature (or power) for an emmetropic eye in a patient of that age and gender in the population;

deriving the average internal dioptric power; and determining the contribution of the axial length, corneal curvature and internal dioptric power to the refractive power of an emmetropic eye in a patient of that age and gender in the population.

* * * * *